(12) United States Patent
Onishi et al.

(10) Patent No.: US 8,472,127 B2
(45) Date of Patent: Jun. 25, 2013

(54) LENS BARREL

(75) Inventors: Hideo Onishi, Osaka (JP); Hironori Honsho, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/230,852

(22) Filed: Sep. 13, 2011

(65) Prior Publication Data

US 2012/0069454 A1    Mar. 22, 2012

(30) Foreign Application Priority Data

Sep. 16, 2010  (JP) ................................. 2010-207500
Aug. 4, 2011   (JP) ................................. 2011-171266

(51) Int. Cl.
   *G02B 7/10*    (2006.01)
   *G02B 15/173*  (2006.01)
   *G02B 15/08*   (2006.01)

(52) U.S. Cl.
   USPC ............................ 359/704; 359/683; 359/675

(58) Field of Classification Search
   USPC ................... 359/701, 826, 704, 675, 683–684
   See application file for complete search history.

(56) References Cited

U.S. PATENT DOCUMENTS

| 7,236,305 B2 * | 6/2007 | Yakita ........................... 359/675 |
| 7,777,976 B2   | 8/2010 | Nomura et al. |
| 2009/0153985 A1 * | 6/2009 | Nagaoka et al. .............. 359/733 |

FOREIGN PATENT DOCUMENTS

JP    2009-217243 A    9/2009

* cited by examiner

*Primary Examiner* — Scott J Sugarman
*Assistant Examiner* — Daniele Manikeu
(74) *Attorney, Agent, or Firm* — Shinjyu Global IP

(57) ABSTRACT

A lens barrel is provided that includes a zoom optical system with an optical axis. The lens barrel also includes a first and a second lens group. The first lens group has a first curved part and a first straight part when viewed axially along the optical axis. The second lens group is axially and movably disposed relative to the first lens group and has a second curved part and a second straight part when viewed axially along the optical axis. The lens barrel is configured to change between an imaging state and a retracted state. In the imaging state, the first and second lens groups are aligned with one another along the optical axis. In the retracted state, the second lens group is disposed off center from the first lens group so that the first straight part is substantially parallel with the second straight part.

9 Claims, 15 Drawing Sheets imaging state

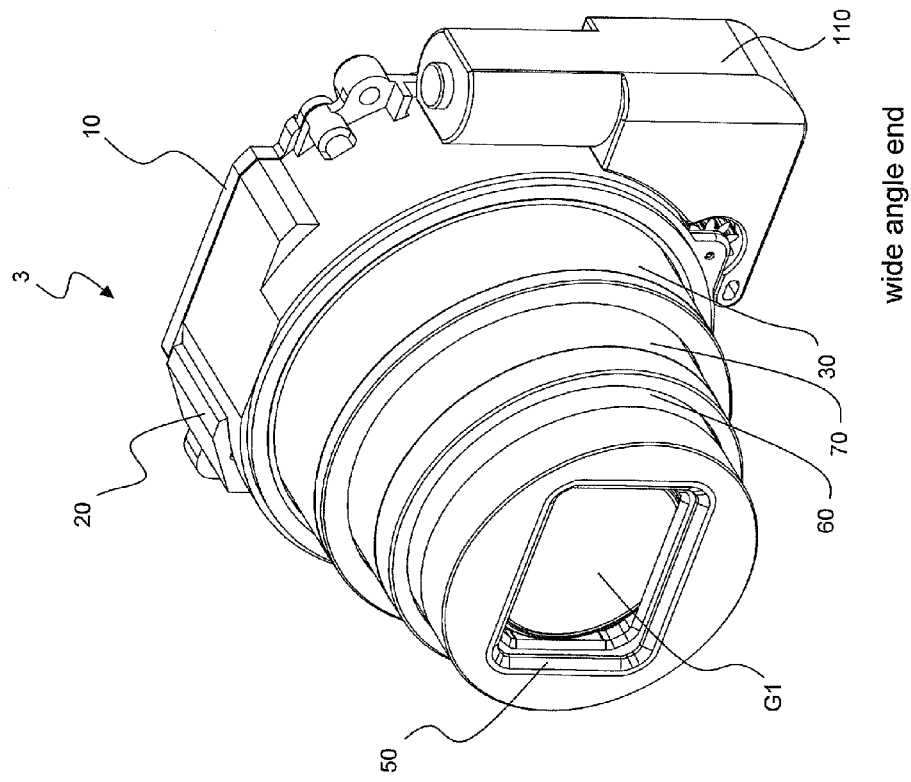
FIG. 3B  wide angle end
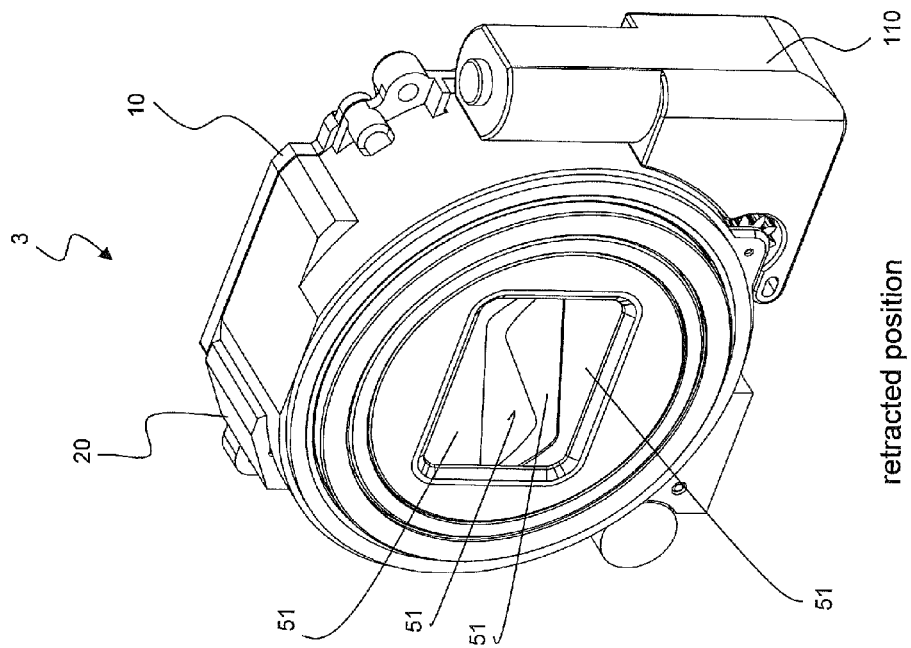
FIG. 3A  retracted position

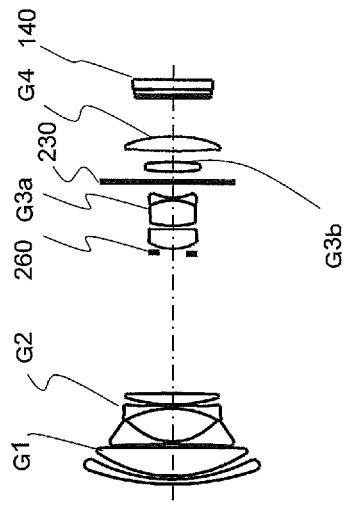
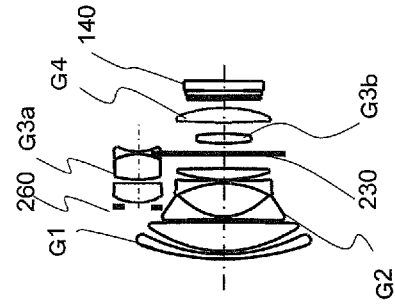
FIG. 15A  wide angle end
FIG. 15B  retracted position wide angle end retracted position wide angle end retracted position

LENS BARREL

CROSS-REFERENCE TO RELATED APPLICATIONS

This application claims priority to Japanese Patent Application No. 2010-207500, filed on Sep. 16, 2010 and Japanese Patent Application No. 2011-171266, filed on Aug. 4, 2011. The entire disclosure of Japanese Patent Application No. 2010-207500 and Japanese Patent Application No. 2011-171266 are hereby incorporated herein by reference.

BACKGROUND

1. Technical Field

The technology disclosed herein generally relates to a lens barrel. More specifically, the technology disclosed herein relates to a retractable lens barrel used in a digital camera or the like.

2. Background Information

Recent years have witnessed the growing popularity of digital cameras that can convert an optical image of a subject into an electrical image signal and output the electrical signal. Of these, compact digital cameras in particular need to be portable, so there is an ongoing need to make the lens barrels installed in these cameras smaller.

Japanese Patent Application 2009-217243 (called "Patent Literature 1" hereinafter) addresses this need. The peripheral edge part of a lens group that does not retract when the lens group is stowed is removed in this Patent Literature 1. Consequently, the retracting lens group can be retracted to this removed part when the lens group is stowed. In Patent Literature 1 this was an attempt to achieve a more compact size while reducing the thickness in a stowed state.

However, with a conventional lens barrel such as that discussed in Patent Literature 1, since the retracting lens group is near the optical aperture position, the cross sectional shape of the light flux that passes through the retracting lens group inevitably ends up being substantially circular. Specifically, the peripheral edge part of the light flux passing through the retracting lens group cannot be removed. Accordingly, the lens barrel ends up being bulkier than a lens barrel that is not retracted when stowed.

SUMMARY

A lens barrel is provided that includes a zoom optical system with an optical axis. The lens barrel also includes a first lens group and a second lens group. The first lens group has a first curved part and a first straight part when viewed axially along the optical axis. The second lens group is axially and movably disposed relative to the first lens group and has a second curved part and a second straight part when viewed axially along the optical axis. The lens barrel is configured to change between an imaging state and a retracted state. In the imaging state, the first and second lens groups are aligned with one another along the optical axis. In the retracted state, the second lens group is disposed off center from the first lens group so that the first straight part is substantially parallel with the second straight part.

In accordance with another aspect of the lens barrel, in the imaging state the second lens group has a cross section that allows a light flux to pass through the second lens group. The cross section has a first distance and a second distance. The first distance defines a first direction that is perpendicular to the optical axis. The second distance is greater than the first distance and defines a second direction that is perpendicular to the first direction and the light flux.

These and other features, aspects and advantages of the technology disclosed herein will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure:

FIG. 3A is a simplified oblique view of a lens barrel (retracted position)
FIG. 3B is a simplified oblique view of a lens barrel (wide angle position);
FIG. 15A is a simplified diagram of an optical system (wide angle end);
FIG. 15B is a simplified diagram of an optical system (retracted position)

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the present technology as defined by the appended claims and their equivalents.

First Embodiment

An embodiment of the present technology will now be described in detail through reference to the drawings.

1: Summary of Digital Camera

Figures 1, 2:
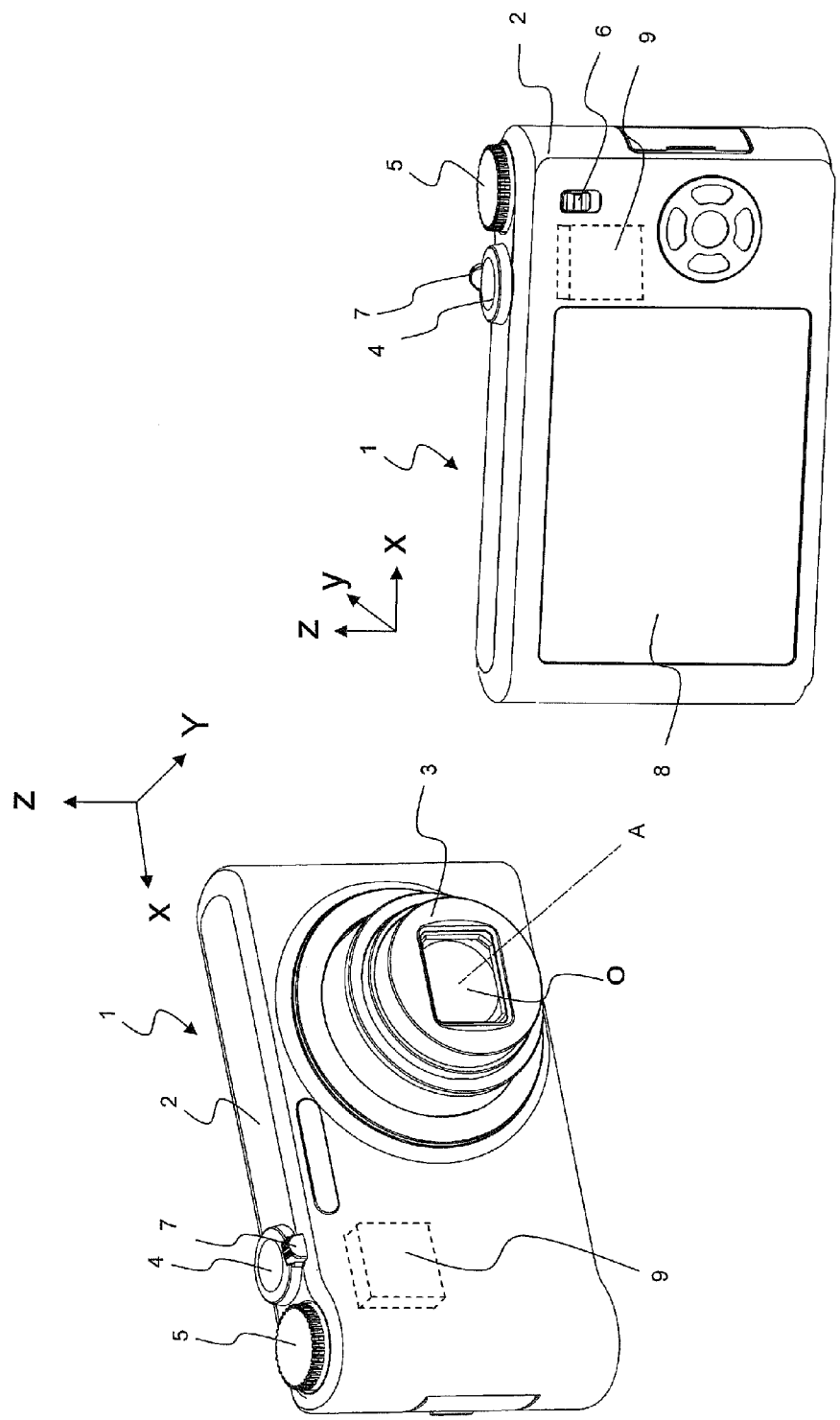
FIG. 1 is a simplified oblique view of a digital camera.
FIG. 2 is a simplified oblique view of a digital camera.

A digital camera 1 will be described through reference to FIGS. 1 and 2. FIGS. 1 and 2 are simplified oblique views of the digital camera 1. FIG. 1 shows when a lens barrel 3 is in an imaging state (wide angle end).

The term "wide angle end" here corresponds to a state in which the focal distance of an optical system O (discussed below) is the shortest one (a state in which the image angle is the maximum one), and "telephoto end" corresponds to a state in which the focal distance of the optical system O is the longest one (a state in which the image angle is the minimum one). The state when the power is ON is defined as the imaging state. The state in which the length of the lens barrel 3 is the shortest one when the power is OFF is defined as a retracted state. The orientation of the lens barrel 3 in the imaging state is defined as an "imaging possible orientation," while the orientation of the lens barrel 3 in the retracted state is defined as a "retracted orientation."

The digital camera 1 is a device for acquiring an image of a subject. A multistage telescoping lens barrel 3 is mounted to the digital camera 1 for higher magnification and size reduction.

In the following description, the six sides of the digital camera 1 are defined as follows. The side facing the subject when an image is being captured with the digital camera 1 is called the front face, and the face on the opposite side is called the rear face. When an image is captured such that up and down in the vertical direction of the subject coincide with up and down in the short-side direction of the rectangular image being captured by the digital camera 1 (the aspect ratio (the ratio of long to short sides) is generally 3:2, 4:3, 16:9, etc.), the side facing upward in the vertical direction is called the top face, and the opposite side is called the bottom face. Further, when an image is captured such that up and down in the vertical direction of the subject coincide with up and down in the short-side direction of the rectangular image being captured with the digital camera 1, the side that is on the left when viewed from the subject side is called the left face, and the opposite side is called the right face. The above definitions are not intended to limit the usage orientation of the digital camera 1.

The same definitions apply not only to the six sides of the digital camera 1, but also to the various constituent members disposed in and on the digital camera 1. Specifically, the above definitions of the six sides apply to the various constituent members in the state in which they have been disposed in or on the digital camera 1.

As shown in FIG. 1, a three-dimensional perpendicular coordinate system is defined, having a Y axis parallel to the optical axis A of the optical system O (discussed below). Based on this definition, the direction facing the front face side from the rear face side along the optical axis A is called the positive side in the Y axis direction. The direction facing the left face side from the right face side and perpendicular to the optical axis A is called the positive side in the X axis direction. Further, the direction facing the top face side from the bottom face side and perpendicular to the X and Y axes is called the positive side in the Z axis direction.

2: Overall Configuration of Digital Camera

As shown in FIGS. 1 and 2, the digital camera 1 mainly comprises a shell 2 that houses various units, the optical system O that forms an optical image of a subject, and the lens barrel 3 that movably supports the imaging optical system O.

The optical system O is made up of a plurality of lens groups, and these lens groups are disposed in a state of being aligned in the Y axis direction. The lens barrel 3 is a multistage telescoping lens barrel. Specifically, the lens barrel 3 is supported by the shell 2. The lens barrel 3 is a three-stage telescoping lens barrel. This lens barrel 3 is configured so that three kinds of frame are deployed in the Y axis direction based on a fixed frame 20 (discussed below). The lens barrel 3 supports a plurality of lens groups so that the plurality of lens groups are capable of relative movement in the Y axis direction. The configuration of the optical system O and the lens barrel 3 will be discussed in detail below.

A CCD image sensor 141 (an example of an imaging element; see FIG. 4) and an image recorder (not shown) are built into the shell 2. The CCD image sensor 141 performs photoelectric conversion on optical images. The image recorder (not shown) records images acquired by the CCD image sensor 141. As shown in FIG. 2, a liquid crystal monitor 8 is provided on the rear face of the shell 2. The liquid crystal monitor 8 displays images acquired by the CCD image sensor 141.

A release button 4, a dial 5, and a zoom adjusting lever 7 are provided on the top face of the shell 2. A power switch 6 is provided on the rear face of the shell 2. The release button 4 is used by the user to control the timing of exposure. The dial 5 is used by the user to make various settings related to the imaging operation. The power switch 6 is used by the user to turn the digital camera 1 on or off. The zoom adjusting lever 7 is used by the user to adjust the zoom ratio, and rotates over a predetermined angle range around the release button 4.

A sensor 9 is built into the interior of the shell 2. The sensor 9 detects shake in the pitch direction (rotation around the X axis) and the yaw direction (rotation around the Z axis) of the digital camera 1 in order to correct image blurring.

3: Configuration of Optical System and Lens Barrel

Figure 8:
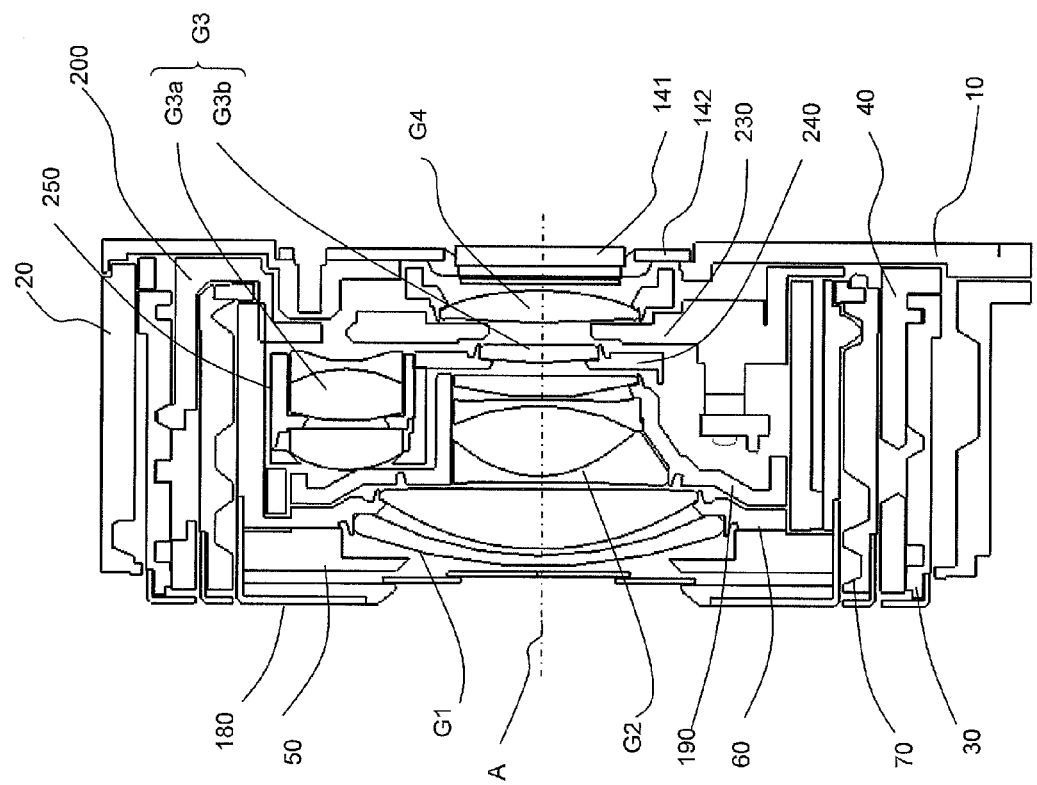
FIG. 8 is a simplified cross section of a lens barrel (retracted position)
Figure 9:
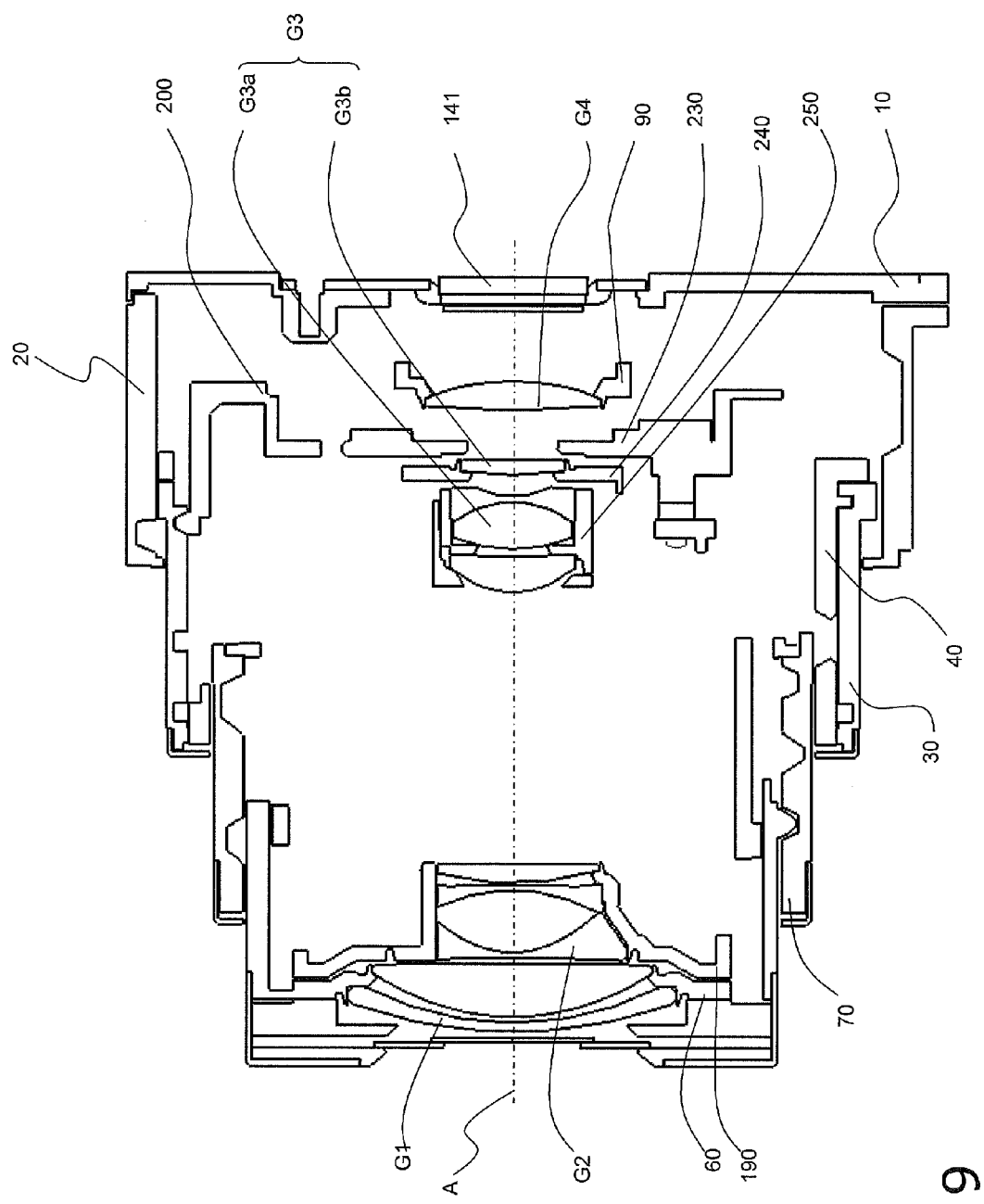
FIG. 9 is a simplified cross section of a lens barrel (wide angle end)
Figure 10:
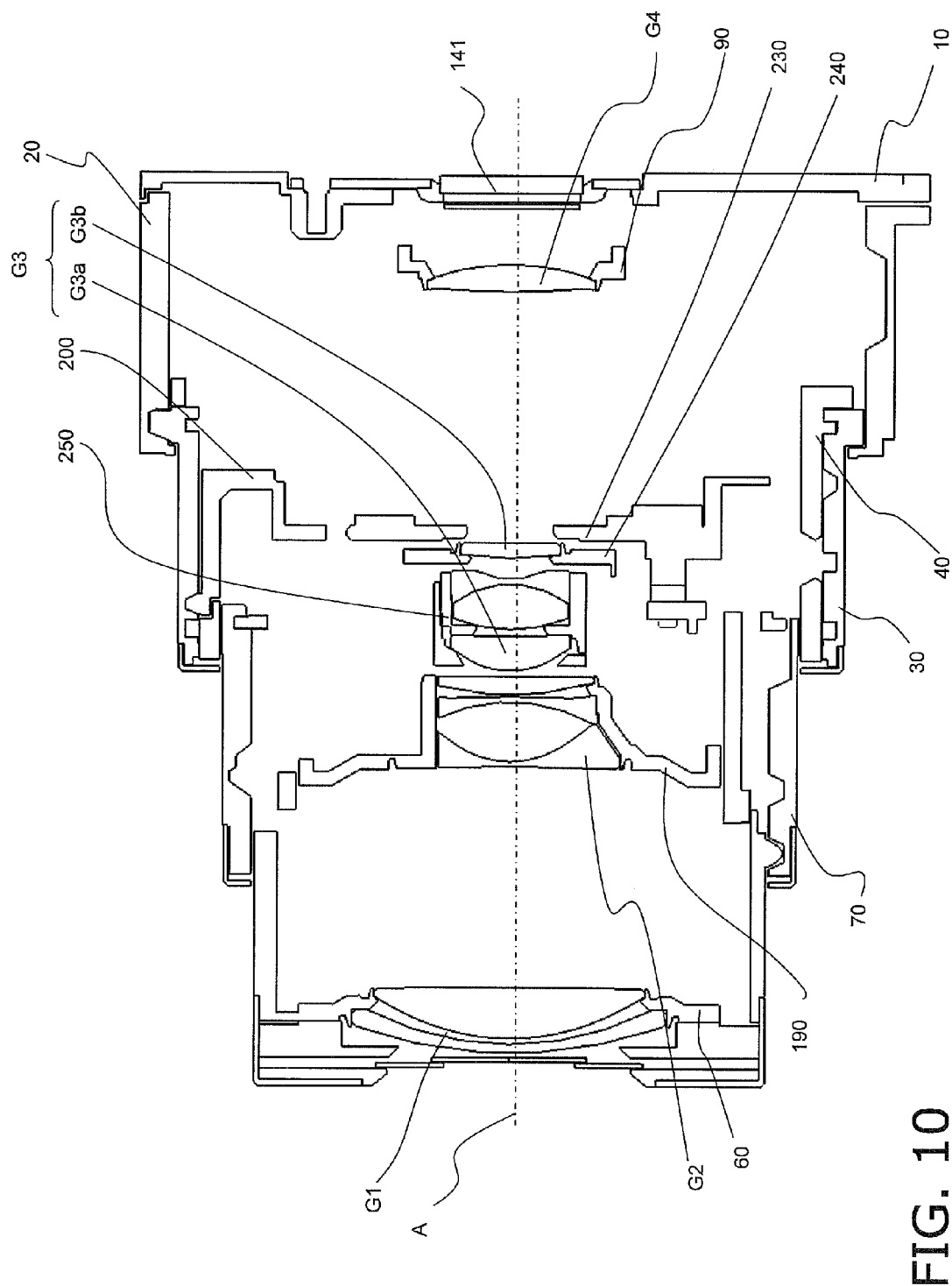
FIG. 10 is a simplified cross section of a lens barrel (telephoto end)

The overall configuration of the lens barrel 3 will now be described through reference to FIGS. 3 to 10. FIGS. 3A and 3B are simplified oblique views of the lens barrel 3. FIGS. 4 to 7 are exploded oblique views of the lens barrel 3. FIG. 3A is a simplified oblique view of the lens barrel 3 when it is retracted (stowed). FIG. 3B is a simplified oblique view of the lens barrel 3 during imaging. FIGS. 8 to 10 are simplified cross sections of the lens barrel 3. FIG. 8 is a cross section of the retracted position, FIG. 9 is a cross section at the wide angle end, and FIG. 10 is a cross section at the telephoto end.

As shown in FIGS. 8 to 10, the optical system O comprises a first lens group G1, a second lens group G2, a third lens group G3 having a retractable lens group G3a and a correcting lens group G3b, and a fourth lens group G4.

The first lens group G1 is a lens group having a positive power overall, for example, and takes in light from the subject side. The second lens group G2 is a lens group having a negative power overall, for example. The retractable lens group G3a is a lens group that retracts in a direction perpendicular to the optical axis of the second lens group G2 in a retracted state. The correcting lens group G3b moves in a direction perpendicular to the optical axis of the second lens group G2, and moves an optical image. Consequently, the correcting lens group G3b is a lens group that suppresses movement of an optical image in the CCD image sensor 141. The movement of an optical image is caused by movement of the digital camera 1, for example. The fourth lens group G4 is a lens group for adjusting the focal point, for example. The optical system O comprising these lens groups is supported movably in the Y axis direction by the lens barrel 3.

Figure 4:
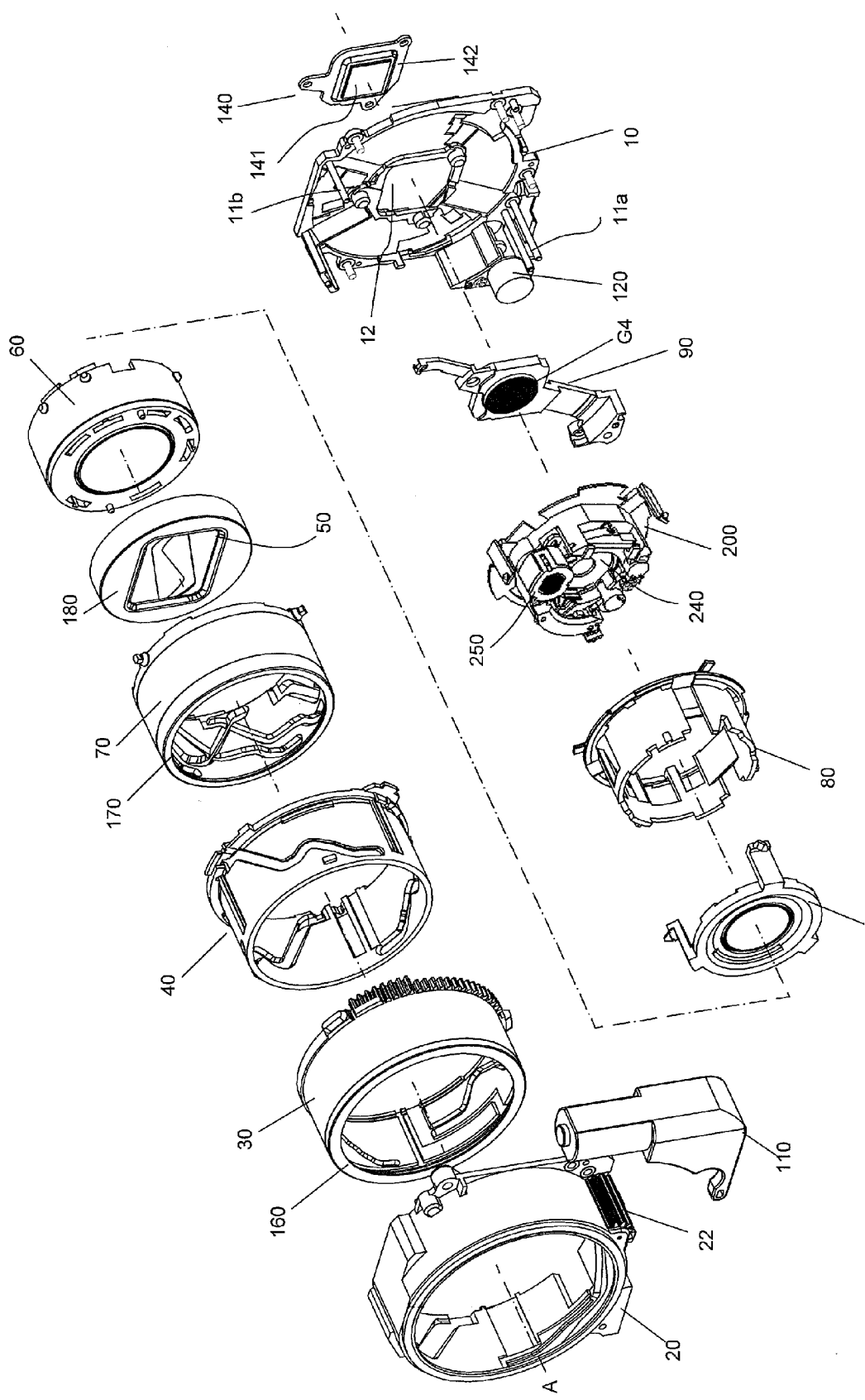
FIG. 4 is an exploded oblique view of a lens barrel.

As shown in FIGS. 3 and 4, the lens barrel 3 comprises the fixed frame 20, a zoom motor unit 110, a master flange 10, a drive frame 30, a camera cam frame 40, a rotary cam frame 70, and a rectilinear frame 80.

The fixed frame 20 is fixed to the shell 2. The zoom motor unit 110 is fixed to the fixed frame 20 and acts as a drive source. The master flange 10 houses various frames between itself and the fixed frame 20. The drive force of the zoom motor unit 110 is inputted to the drive frame 30. The camera cam frame 40 is supported movably in the Y axis direction by the fixed frame 20. The rotary cam frame 70 rotates along with the drive frame 30. The rectilinear frame 80 moves in the Y axis direction in a state of being unable to rotate with respect to the fixed frame 20.

The drive frame 30 and the rotary cam frame 70 are movable in the Y axis direction and rotatable with respect to the fixed frame 20. Other members move in the Y axis direction without rotating with respect to the fixed frame 20. The CCD image sensor 141 is attached to the master flange 10. An example of the zoom motor unit 110 is a unit composed of a DC motor and a reduction gear.

The lens barrel 3 further comprises a first lens frame 60, a second lens frame 190, a retractable lens frame 250, a correcting lens frame 240, a third lens frame 200, and a fourth lens frame 90.

The first lens frame 60 supports the first lens group G1. The second lens frame 190 supports the second lens group G2. The retractable lens frame 250 supports the retractable lens group G3a. More precisely, the retractable lens frame 250 supports the retractable lens group G3a so that the retractable lens group G3a is retracted to a retracted position. The correcting lens frame 240 supports the image blur correcting lens group G3b. The third lens frame 200 supports the retractable lens frame 250 and the correcting lens frame 240. The fourth lens frame 90 supports the fourth lens group G4.

3.1: Fixed Frame

Figure 5:
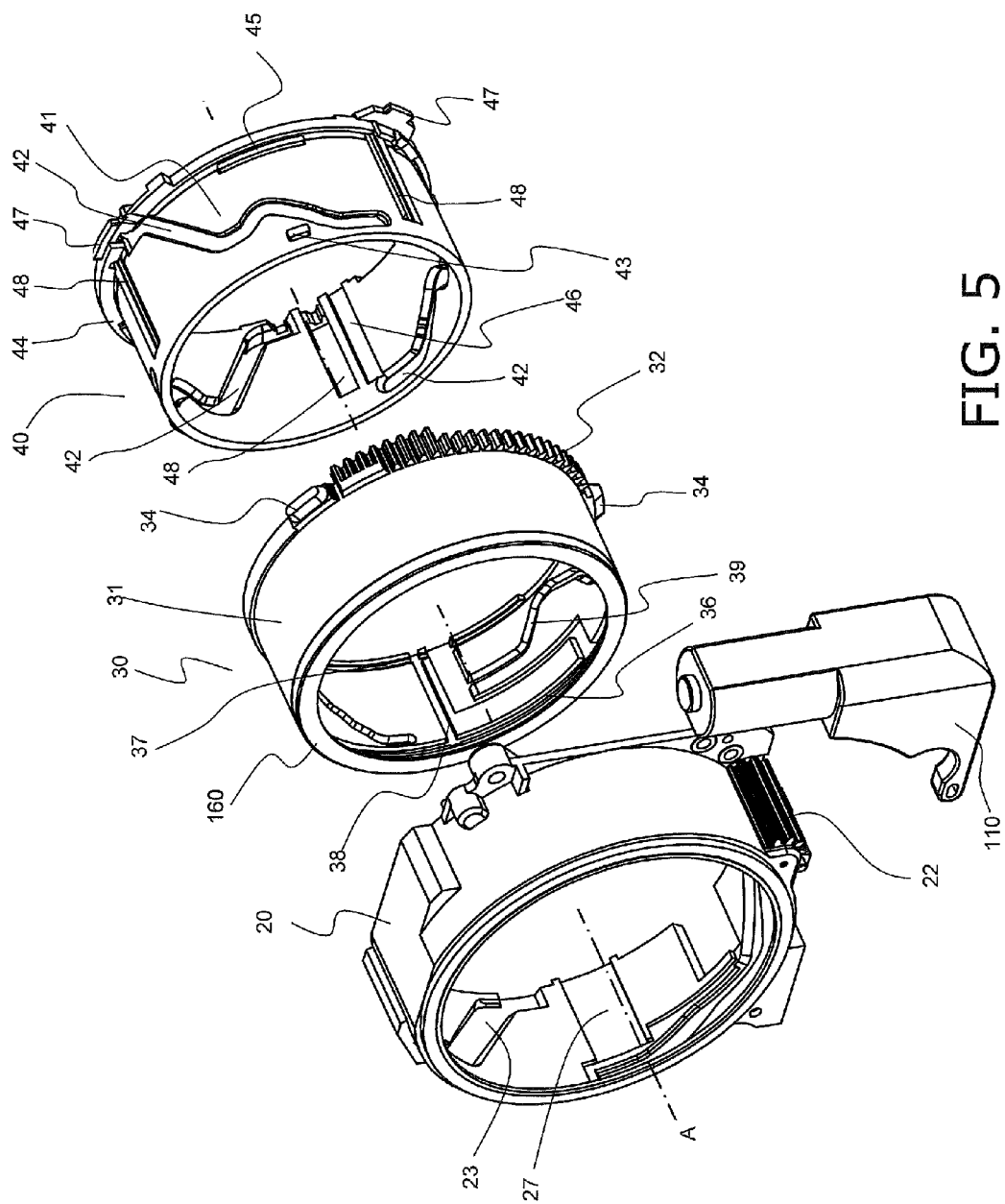
FIG. 5 is an exploded oblique view of a lens barrel.

As shown in FIGS. 4 and 5, the fixed frame 20 is a member for supporting the drive frame 30 rotatably around the optical axis A and rectilinearly-movably in the Y axis direction. The fixed frame 20 is a stationary member in the lens barrel 3 along with the master flange 10. The fixed frame 20 is fixed by screws to the master flange 10, for example. The fixed frame 20 is equipped with a drive gear 22. The drive gear 22 is rotatably supported by the fixed frame 20.

The drive gear 22 is a member for transmitting the drive force of the zoom motor unit 110 to the drive frame 30. The drive gear 22 engages with the gear (not shown) of the zoom motor unit 110.

Three cam grooves 23 and three rectilinear grooves 27 disposed at a substantially equal pitch in the circumferential direction are formed on the inner peripheral side of the fixed frame 20. Cam pins 34 of the drive frame 30 are inserted into the cam grooves 23. The rectilinear grooves 27 are used to guide the camera cam frame 40 in the Y axis direction. Rectilinear protrusions 47 are inserted into the rectilinear grooves 27.

3.2: Drive Frame

As shown in FIGS. 4 and 5, the drive frame 30 is a member for supporting the camera cam frame 40 rotatably around the optical axis A and integrally-movably in the Y axis direction. The drive frame 30 is disposed on the inner peripheral side of the fixed frame 20.

The drive frame 30 mainly has a substantially cylindrical drive frame main body 31, a gear 32, and the three cam pins 34. The drive frame main body 31 is disposed between the fixed frame 20 and the camera cam frame 40 (discussed below) in the radial direction. A trim ring 160 is attached to the end of the drive frame main body 31 on the Y axis direction positive side. A light blocking ring (not shown) in the form of a hollow and thin disk is sandwiched between the trim ring 160 and the drive frame main body 31. The gear 32 is formed on the outer peripheral face of the drive frame main body 31. The gear 32 engages with the drive gear 22, and the drive force of the zoom motor unit 110 is transmitted through the drive gear 22 to the drive frame 30. The three cam pins 34 are disposed at a substantially equal pitch in the circumferential direction around the outer peripheral face of the drive frame main body 31. The three cam pins 34 each fit one of the cam grooves 23 of the fixed frame 20. Consequently, the drive frame 30 moves in the Y axis direction while rotating around the optical axis A with respect to the fixed frame 20.

A first rotary groove 36, a second rotary groove 37, three rectilinear grooves 38, and three cam grooves 39 are formed on the inner peripheral side of the drive frame main body 31. The first rotary groove 36 is used to guide first rotary protrusions 43 of the camera cam frame 40 in the rotational direction. The second rotary groove 37 is used to guide second rotary protrusions 45 in the rotational direction. The rectilinear grooves 38 are used to guide cam pins 76 (discussed below) of the rotary cam frame 70. The three rectilinear grooves 38 are disposed at a substantially equal pitch in the circumferential direction on the inner peripheral face of the drive frame main body 31.

3.3: Camera Cam Frame

As shown in FIG. 4, the camera cam frame 40 is a member for guiding the rotary cam frame 70 (discussed below) in the optical axis direction. The camera cam frame 40 is disposed on the inner peripheral side of the drive frame 30.

As shown in FIG. 5, the camera cam frame 40 mainly has a substantially cylindrical camera cam frame main body 41 (constitutes the main component), three cam through-grooves 42 formed in the camera cam frame main body 41, three rectilinear through-grooves 48, the three first rotary protrusions 43, the three second rotary protrusions 45, three rectilinear grooves 46, the three rectilinear protrusions 47, and a flange 44.

The camera cam frame main body 41 is disposed between the fixed frame 20 and the rotary cam frame 70. The three cam through-grooves 42 are disposed at an equal pitch in the circumferential direction. The cam pins 76 (discussed below) of the rotary cam frame 70 go through the three cam through-grooves 42 in the radial direction.

The three rectilinear protrusions 47 are disposed at an equal pitch in the circumferential direction. The three rectilinear protrusions 47 are inserted in the rectilinear grooves 27 of the fixed frame 20, and are guided in the Y axis direction.

The first rotary protrusions 43 and the second rotary protrusions 45 are positioning protrusions. The first rotary protrusions 43 and the second rotary protrusions 45 are guided in the rotational direction by the first rotary groove 36 and the second rotary groove 37 of the drive frame 30. Consequently, the camera cam frame 40 moves integrally with the drive frame 30 in the Y axis direction, while rotating as needed with respect to the drive frame 30. When the drive frame 30 rotates with respect to the fixed frame 20, the drive frame 30 moves in the Y axis direction with respect to the fixed frame 20. At this point, the camera cam frame 40 moves along with the drive frame 30 in the Y axis direction with respect to the fixed frame 20, without rotating with respect to the fixed frame 20 (that is, while rotating relatively with respect to the drive frame 30).

Second rectilinear protrusions 85 of the rectilinear frame 80 (discussed below) are inserted into the three rectilinear grooves 46. Consequently, the rotation of the rectilinear frame 80 is restricted in the rotational direction with respect to the camera cam frame 40. The rectilinear frame 80 is movable in the Y axis direction.

Rectilinear protrusions 203 of the third lens frame 200 (discussed below) are inserted into the three rectilinear through-grooves 48. Consequently, the rotation of the third lens frame 200 is restricted in the rotational direction with respect to the camera cam frame 40. The third lens frame 200 is movable in the Y axis direction.

3.4: Rotary Cam Frame

Figure 6:
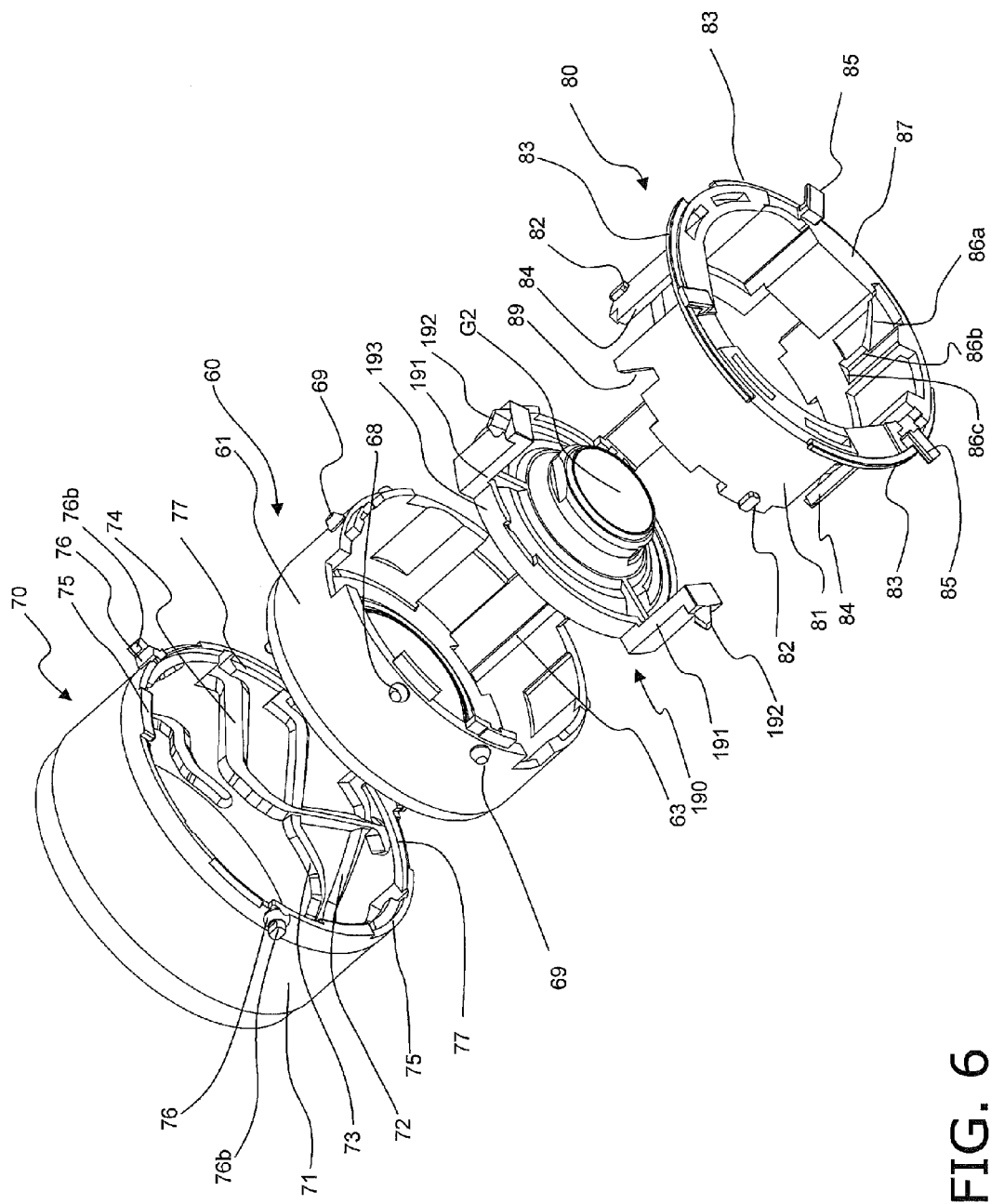
FIG. 6 is an exploded oblique view of a lens barrel.

As shown in FIG. 6, the rotary cam frame 70 is a member for supporting movably the first lens frame 60 (discussed below) and the second lens frame 190 (discussed below) in the Y axis direction. The rotary cam frame 70 is disposed on the outer peripheral side of the first lens frame 60 and the inner peripheral side of the fixed frame 20. More specifically, the rotary cam frame 70 mainly has a substantially cylindrical cam frame main body 71, the three cam pins 76, and three rotary protrusions 75.

The three cam pins 76 are provided on the outer peripheral side of the cam frame main body 71. The three cam pins 76 are disposed at an equal pitch in the circumferential direction.

The three rotary protrusions 75 are formed at the end of the cam frame main body 71 on the Y axis direction negative side. The rotary protrusions 75 are molded integrally with the cam frame main body 71. The rotary protrusions 75 protrude inward in the radial direction from rotary grooves 77. Rotary protrusions 83 of the rectilinear frame 80 are sandwiched between the rotary protrusions 75 and the rotary grooves 77. As a result, movement of the rectilinear frame 80 in the Y axis direction with respect to the rotary cam frame 70 is restricted.

The distal ends 76b of the cam pins 76 are inserted into the rectilinear grooves 38 (see FIG. 5) of the drive frame 30, so the rotary cam frame 70 is rotatable integrally with the drive frame 30 while moving the Y axis direction with respect to the drive frame 30. Also, the cam pins 76 are inserted into the cam through-grooves 42 of the camera cam frame 40, so when the drive frame 30 and the camera cam frame 40 rotate relatively, the rotary cam frame 70 and the camera cam frame 40 also rotate relatively. In this case, the cam pins 76 move along the cam through-grooves 42. As a result, the rotary cam frame 70 rotates along with the drive frame 30 while moving in the Y axis direction with respect to the drive frame 30, according to the shape of the cam through-grooves 42.

With the above configuration, the rotary cam frame 70 rotates integrally with the drive frame 30, and moves in the Y axis direction with respect to the drive frame 30. Specifically, the rotary cam frame 70 can rotate with respect to the fixed frame 20 while moving in the Y axis direction. The amount of movement of the rotary cam frame 70 in the Y axis direction is the sum of the amount of movement of the drive frame 30 in the Y axis direction with respect to the fixed frame 20, plus the amount of movement of the rotary cam frame 70 in the Y axis direction with respect to the drive frame 30.

3.4.1: Configuration of First Cam Grooves 72, Second Cam Grooves 73, and Third Cam Grooves 74

As shown in FIG. 6, three first cam grooves 72, three second cam grooves 73, and three third cam grooves 74 are formed on the inner peripheral side of the cam frame main body 71. First cam pins 68 of the first lens frame 60 are inserted into the first cam grooves 72. Consequently, the rotary cam frame 70 movably supports the first lens frame 60. The second cam grooves 73 are mainly reinforcing cam grooves, and second cam pins 69 are inserted into the second cam grooves 73. The three first cam grooves 72 are disposed at an equal pitch in the circumferential direction. The three second cam grooves 73 are also disposed at an equal pitch in the circumferential direction. The shape of the second cam grooves 73 is the same as the shape of the first cam grooves 72.

With this configuration, when the rotary cam frame 70 rotates with respect to the first lens frame 60, the first cam pins 68 are guided by the first cam grooves 72. As a result, the first lens frame 60 moves in the Y axis direction with respect to the rotary cam frame 70.

Also, cam pins 192 (discussed below) of the second lens frame 190 are inserted into the third cam grooves 74. Consequently, when the rotary cam frame 70 rotates with respect to the second lens frame 190, the cam pins 192 are guided by the third cam grooves 74. As a result, the second lens frame 190 move in the Y axis direction with respect to the rotary cam frame 70.

3.5: Rectilinear Frame

As shown in FIG. 6, the rectilinear frame 80 mainly has a rectilinear frame main body 81, a flange 87, three first rectilinear protrusions 82, three second rectilinear protrusions 85, three rectilinear grooves 84, and three rotary protrusions 83. The rectilinear frame 80 is disposed between the first lens frame 60 and the second lens frame 190 (discussed below) in the radial direction.

The flange 87 protrudes on the outer peripheral side and on the Y axis direction negative side of the rectilinear frame main body 81, and is formed integrally with the rectilinear frame main body 81. The three first rectilinear protrusions 82 are provided on the outer peripheral part of the rectilinear frame main body 81, and protrude outward in the radial direction from the rectilinear frame main body 81. The three first rectilinear protrusions 82 are disposed at an equal pitch in the circumferential direction. The three first rectilinear protrusions 82 are inserted into first rectilinear grooves 63 (discussed below) of the first lens frame 60. The second rectilinear protrusions 85 are molded integrally with the flange 87 on the end of the flange 87 in the Y axis negative direction, and protrude outward in the radial direction from the flange 87. The second rectilinear protrusions 85 are inserted into the rectilinear grooves 46 (see FIG. 5) of the camera cam frame 40. Consequently, the rectilinear frame 80 moves in the Y axis direction without rotating with respect to the camera cam frame 40.

The rectilinear grooves 84 are through-grooves that pass through in the radial direction, and extend in the Y axis direction. The three rectilinear grooves 84 are disposed at an equal pitch in the circumferential direction. Three rectilinear protrusions 191 of the second lens frame 190 (discussed below) are inserted into the three rectilinear grooves 84.

The first lens frame 60 and the second lens frame 190 are movable in the Y axis direction with respect to the rectilinear frame 80 without rotating with respect to the rectilinear frame 80. This motion is implemented by the first rectilinear protrusions 82 and the rectilinear grooves 84. Specifically, the first lens frame 60 and the second lens frame 190 are movable in the Y axis direction without rotating with respect to the fixed frame 20.

The three rotary protrusions 83 are inserted into the rotary grooves 77 of the rotary cam frame 70. The rotary cam frame 70 is rotatable with respect to the rectilinear frame 80 and to move integrally in the Y axis direction. This motion is implemented by the rotary grooves 77 and the rotary protrusions 75.

Sloped protrusions 89 function as drive protrusions for pushing a lever (not shown) that opens and closes the a lens barrier 50 in the rotational direction. The sloped protrusions 89 are configured so that barrier vanes 51 (see FIG. 3A) close when the opening/closing lever has rotated to a retracted position that the lens barrier 50 is closest to the rectilinear frame 80 in the Y axis direction.

Figure 11:
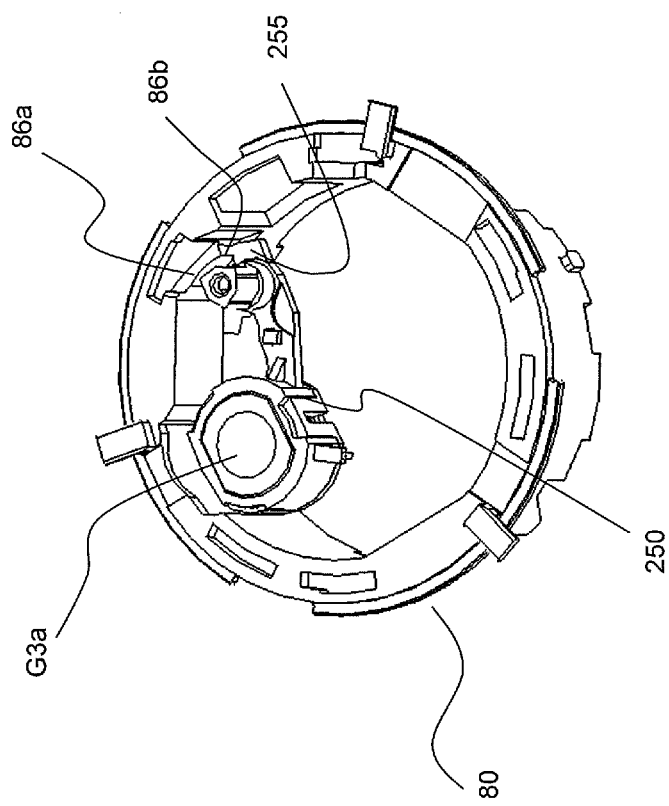
FIG. 11 is an oblique view of a retracting lens frame and a rectilinear frame.

FIG. 11 is an oblique view of the retractable lens frame 250 and the rectilinear frame 80. FIG. 12A is a plan view of the retracted state of the retractable lens frame 250. FIG. 12B is a plan view of when the retractable lens frame 250 is in an imaging state. As shown in FIGS. 6 and 11, the rectilinear frame 80 has the rectilinear frame main body 81. A sloped face 86a, a rectilinear restricting face 86b, and an end face 86c are provided on the inner peripheral side of the rectilinear frame main body 81. The sloped face 86a is a cam face that rotates a drive protrusion 255 of the retractable lens frame 250 (discussed below). The rectilinear restricting face 86b further rotates the drive protrusion 255 so as to retract the retractable lens group G3a of the retractable lens frame 250 to the retracted position (see FIG. 12A). The end face 86c drives the drive protrusion 255 to the Y axis direction negative side.

Thus, the rectilinear frame main body 81 (86a, 86b, 86c) of the rectilinear frame 80, for example, has a mechanism 400 (retraction drive mechanism) that retracts the retractable lens group G3a to the retracted position. To summarize the above, the retraction drive mechanism 400 disposes the optical axis of the retractable lens group G3a to a position a specific distance away from the optical axis of the correcting lens group G3b (retracted position), and thereby retracts the retractable lens group G3a.

3.6: First Lens Frame

Figure 7:
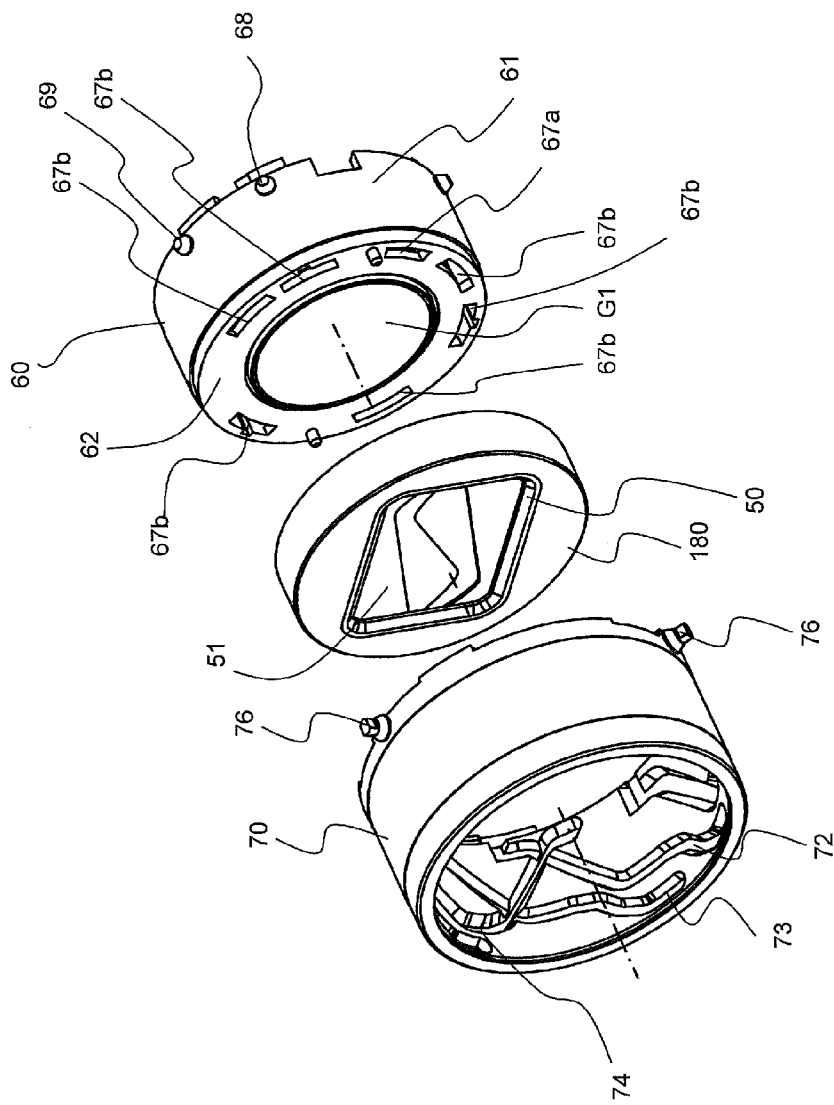
FIG. 7 is an exploded oblique view of a lens barrel.

As shown in FIGS. 4, 6, and 7, the first lens frame 60 is a member for supporting the first lens group G1. The first lens frame 60 is disposed on the inner peripheral side of the camera cam frame 40. More specifically, the first lens frame 60 mainly has a first lens frame main body 61 and a flange 62 to which the first lens group G1 is fixed. The flange 62 is provided to the end of the first lens frame main body 61 on the Y axis direction positive side. One first opening 67a and six second openings 67b that pass through in the Y axis direction are formed in the flange 62. A lever (not shown) for opening and closing the lens barrier 50 is inserted into the first opening 67a so as to be movable in the rotational direction during telescoping. The lens barrier 50 is fixed on the Y axis direction positive side of the first lens frame 60. As shown in FIG. 7, the lens barrier 50 and the first lens frame 60 are covered by a trim ring 180.

As shown in FIG. 6, the three first rectilinear grooves 63 are provided on the inner peripheral side of the first lens frame main body 61. The three first cam pins 68 and the three second cam pins 69 are provided on the outer peripheral side of the first lens frame main body 61.

The first rectilinear grooves 63 are guided by the first rectilinear protrusions 82 of the rectilinear frame 80. Consequently, the first lens frame 60 moves in the Y axis direction without rotating with respect to the rectilinear frame 80. Specifically, the first lens frame 60 is supported by the rectilinear frame 80 and the camera cam frame 40 so as to be movable in the Y axis direction without rotating with respect to the fixed frame 20.

As shown in FIG. 6, the first cam pins 68 are positioning pins. The second cam pins 69 are mainly reinforcing pins. The first cam pins 68 are guided by the first cam grooves 72 of the rotary cam frame 70. The second cam pins 69 are inserted into the second cam grooves 73 of the rotary cam frame 70, with a gap in between. Consequently, the first lens frame 60 is supported by the rotary cam frame 70 so as to be movable in the Y axis direction while rotating with respect to the rotary cam frame 70.

3.7: Second Lens Frame

The second lens frame 190 is a member for supporting the second lens group G2 movably in the Y axis direction. The second lens frame 190 is disposed on the inner peripheral side of the rectilinear frame 80. More specifically, as shown in FIG. 6, the second lens frame 190 mainly has a second lens frame main body 193 that supports the second lens group G2, the three rectilinear protrusions 191 formed on the outer peripheral part of the second lens frame main body 193, and the three cam pins 192 provided on the outer peripheral side of the rectilinear protrusions 191.

The rectilinear protrusions 191 are flat protrusions that extend in the Y axis direction, and are disposed at positions corresponding to the rectilinear grooves 84 of the rectilinear frame 80. The three rectilinear protrusions 191 are disposed at an equal pitch in the circumferential direction. The second lens frame 190 are movable in the Y axis direction without rotating with respect to the rectilinear frame 80. This motion is implemented by the rectilinear grooves 84 and the rectilinear protrusions 191.

The cam pins 192 protrude outward in the radial direction from the ends of the rectilinear protrusions 191 (more precisely, the ends on the Y axis direction negative side). The cam pins 192 are fitted into the third cam grooves 74 of the rotary cam frame 70.

With the above configuration, the second lens frame 190 is movable in the Y axis direction, according to the shape of the third cam grooves 74, without rotating with respect to the fixed frame 20.

Figure 14:
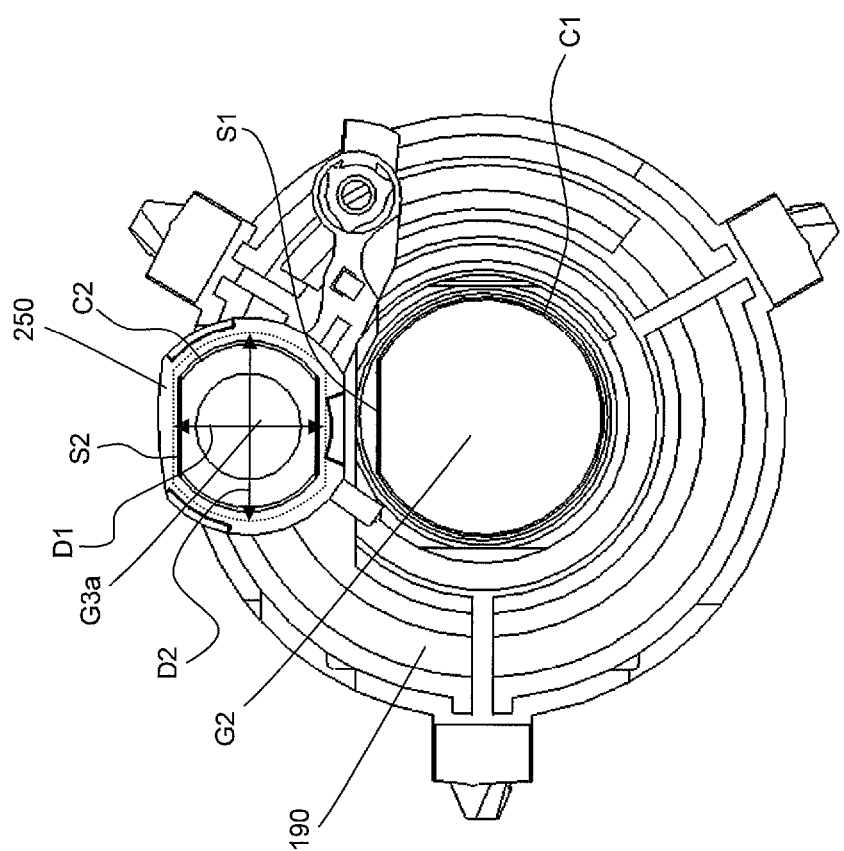
FIG. 14 is a plan view of a second lens frame and a retracting lens frame (retracted state)

Furthermore, as shown in FIG. 14, the second lens group G2 is formed in a shape that cuts out the portion corresponding to the short-side direction of the captured rectangular image. More specifically, the external shape of the second lens group G2 is formed to include a curved part C1 and a straight part S1. Even more specifically, the upper outer edge of the second lens group G2 is formed in a linear shape, while the outer edge other than the upper outer edge of the second lens group G2 is formed in an arc shape. Similarly, the second lens frame 190 that supports the second lens group G2 is formed in a shape in which a portion is cut out, as mentioned above. Consequently, the retractable lens frame 250 can be housed in this cut-out part (when put in the retracted state)., which allows the size of the lens barrel to be reduced.

3.8: Third Lens Frame

As shown in FIG. 4, the third lens frame 200 constitutes a shake correction device, and is disposed on the inner peripheral side of the rectilinear frame 80. The shake correction device shown here serves to suppress movement of the optical image with respect to the CCD image sensor 141. The movement of the optical image is caused by movement of the shell 2.

Figure 12:
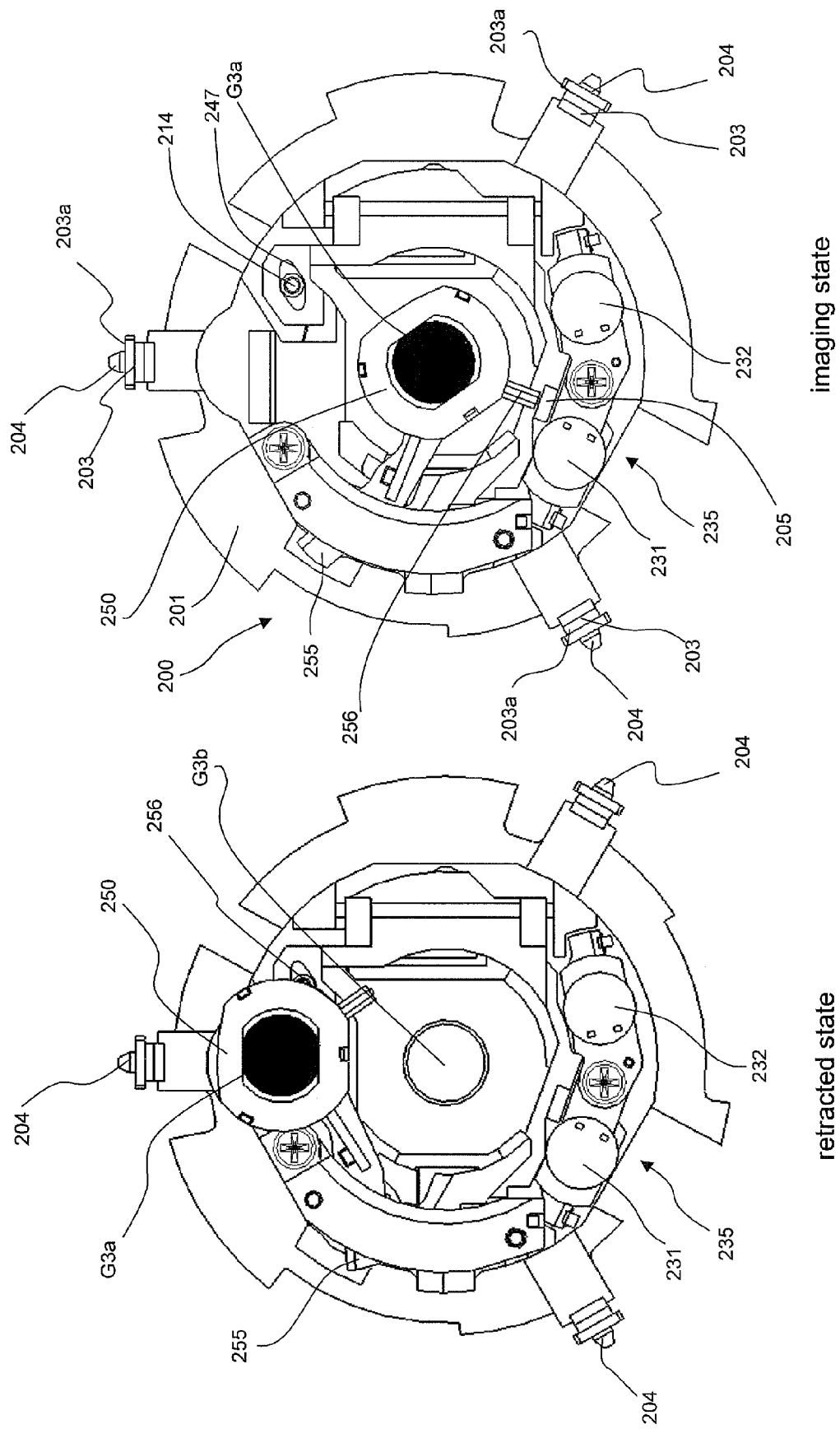
FIG. 12A is a plan view of a third lens group (retracted state)
FIG. 12B is a plan view of a third lens group (imaging state)

The third lens frame 200 is movable integrally in the Y axis direction, and supports the third lens group G3 movably in a plane perpendicular to the optical axis. More specifically, as shown in FIGS. 12 and 13, the third lens frame 200 mainly has a base frame 201, the retractable lens frame 250 that supports the retractable lens group G3a, the correcting lens frame 240 that supports the correcting lens group G3b, a retraction main axis cover 270, and a torsion compression coil spring 258.

The correcting lens group G3b is supported movably in a direction perpendicular to the optical axis A by an image blur correcting lens support mechanism 290 such as the correcting lens frame 240 and the base frame 201.

Figure 13:
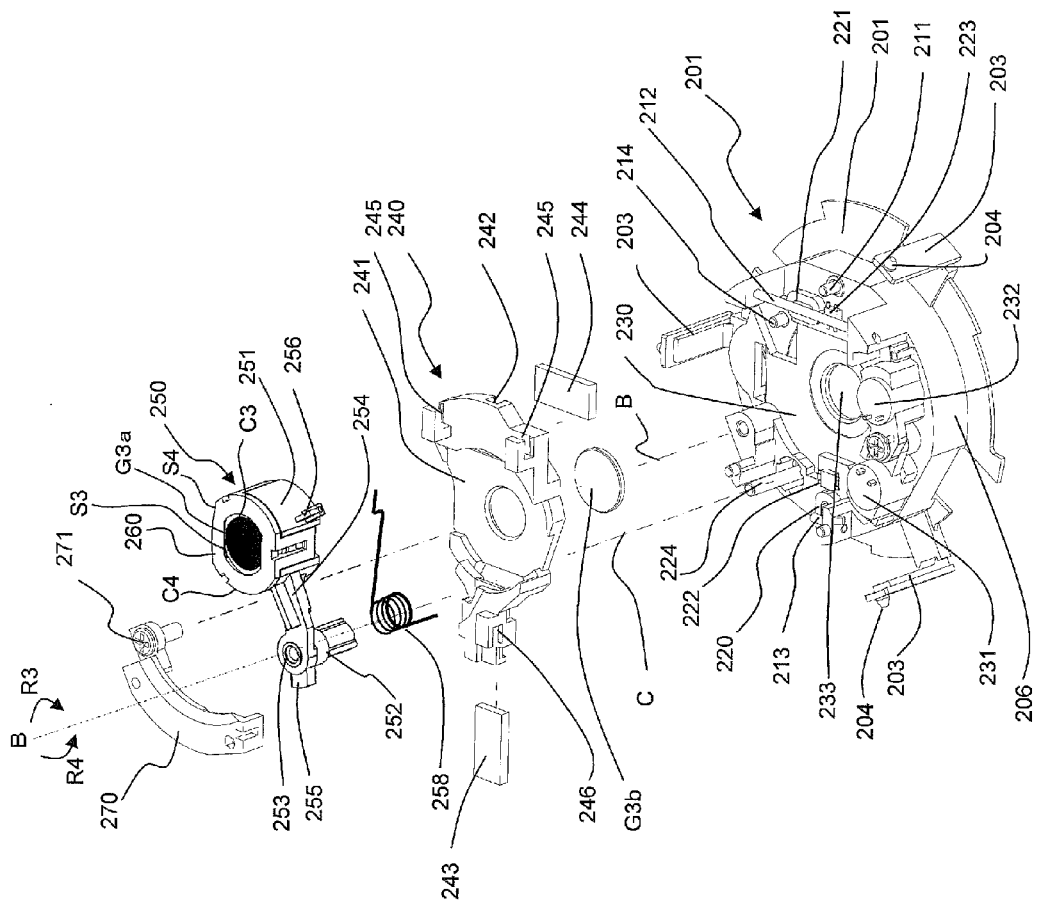
FIG. 13 is an exploded oblique view of the third lens group.

As shown in FIG. 13, the base frame 201 has a substantially cylindrical base frame main body 206, the three rectilinear protrusions 203, three cam pins 204, a rotary shaft 211, a restricting shaft 214, a first support shaft 212, and a second support shaft 213. The three rectilinear protrusions 203 extend outward in the radial direction from the outer peripheral part of the base frame main body 206. The rectilinear protrusions 203 are flat protrusions that extend in the Y axis direction. These rectilinear protrusions 203 are inserted into the rectilinear through-grooves 48 of the camera cam frame 40. The cam pins 204 protrude outward in the radial direction from the outer peripheral part of the rectilinear protrusions 203. The cam pins 204 are fitted into the cam grooves 39 of the drive frame 30.

The rotary shaft 211, the restricting shaft 214, the first support shaft 212, and the second support shaft 213 are fixed to the base frame 201. The rotary shaft 211 supports the correcting lens frame 240 rotatably around the axis of the rotary shaft 211. The restricting shaft 214 restricts the movement range of the correcting lens frame 240 with respect to the base frame 201 (more precisely, the movement range in the Z axis direction and the X axis direction perpendicular to the optical axis A). The restricting shaft 214 is inserted into a restrictor 247 (see FIG. 12B) formed on a support frame main body 241.

The first support shaft 212 and the second support shaft 213 support the correcting lens frame 240 movably within a plane perpendicular to the optical axis A. The first support shaft 212 and the second support shaft 213 restrict the movement range of the correcting lens frame 240 in the Y axis direction with respect to the base frame 201. Both ends of the first support shaft 212 are fixed to the base frame main body 206. The second support shaft 213 is formed shorter than the first support shaft 212, and one end of the second support shaft 213 is fixed to the base frame main body 206.

The correcting lens frame 240 is supported by the base frame 201 movably in the pitch direction (such as the X axis direction) and the yaw direction (such as the Z axis direction). More specifically, the correcting lens frame 240 has the support frame main body 241, a first guide component 242, a pair of second guide components 245, a third guide component 246, and the restrictor 247. The correcting lens group G3$b$ is fixed to the correcting lens frame 240.

The first guide component 242 is a slender groove that extends in the X axis direction. The rotary shaft 211 is inserted into the first guide component 242. The correcting lens frame 240 is movable in the X axis direction and rotate around the center of the rotary shaft 211 with respect to the third lens frame 200. This motion is implemented by the first guide component 242 and the rotary shaft 211.

The pair of second guide components 245 are L-shaped portions that slide with the first support shaft 212. The second guide components 245 protrude in the X axis direction from the base frame 201. The second guide components 245 are spaced apart in the Z axis direction. The first support shaft 212 is inserted between the support frame main body 241 and the second guide components 245. The second guide components 245 and the first support shaft 212 restrict the movement of the correcting lens frame 240 in the Y axis direction with respect to the third lens frame 200.

The third guide component 246 is an L-shaped portion that slides with the second support shaft 213. The second support shaft 213 is inserted between the support frame main body 241 and the third guide component 246. The third guide component 246 and the second support shaft 213 restrict the movement of the correcting lens frame 240 in the Y axis direction with respect to the third lens frame 200.

The third lens frame 200 further has a pitch coil 221, a pitch magnet 244, and a pitch position sensor 223 in order to move the correcting lens group G3$b$ in the pitch direction (an example of a first direction) that is perpendicular to the optical axis A. In this embodiment, the pitch coil 221 is fixed to the base frame 201. The pitch magnet 244 is adhesively fixed, for example, to the correcting lens frame 240. The pitch position sensor 223 is fixed to the base frame 201.

The third lens frame 200 further has a yaw coil 220, a yaw magnet 243, and a yaw position sensor 222 in order to move the correcting lens group G3$b$ in the yaw direction (the Z axis direction; an example of a second direction) that is perpendicular to the optical axis A. In this embodiment, the yaw coil 220 is fixed to the base frame 201. The yaw magnet 243 is adhesively fixed, for example, to the correcting lens frame 240. The yaw position sensor 222 is fixed to the base frame 201.

The shutter unit 230, which adjusts the exposure time, is disposed inside the base frame main body 206. The shutter unit 230 has ND filter vanes (not shown) and shutter vanes (not shown). The shutter unit 230 is supported by the base frame 201.

Also, the shutter drive unit 235 for driving the shutter unit 230 is disposed on the base frame 201. The shutter drive unit 235 has a first drive unit 231 and a second drive unit 232. The first drive unit 231 drives an ND filter. The second drive unit 232 drives shutter vanes. As shown in FIGS. 12A and 12B, the correcting lens group G3$b$ is disposed between the shutter drive unit 235 and the retractable lens group G3$a$ that has been retracted out of the optical path, in the radial direction when viewed in the Y axis direction.

The third lens frame 200 further has a rotary shaft 224 that protrudes on the Y axis direction positive side of the base frame 201, and a stopper 205 consisting of a substantially rectangular protrusion. The rotary shaft 224 is inserted into a guide hole 253 in the retractable lens frame 250 (discussed below). The stopper 205 is provided in order to position to the retractable lens frame 250. In a state in which the stopper 205 is in contact with a positioning protrusion 256 (discussed below) of the retractable lens frame 250, the optical axis C of the retractable lens group G3$a$ coincides with the optical axis A.

3.8.1: Retraction Lens Frame

The retractable lens frame 250 supports the retractable lens group G3$a$ retractably out of the optical path of the optical system O. More specifically, as shown in FIGS. 12 and 13, the retractable lens frame 250 has a lens frame main body 251, a linking arm 254, a cylinder 252, the drive protrusion 255, and the positioning protrusion 256.

The lens frame main body 251 supports the retractable lens group G3$a$. The linking arm 254 extends outside from lens frame main body 251. The cylinder 252 is provided at the end of the linking arm 254. The cylinder 252 is linked with the lens frame main body 251 by the linking arm 254. The cylinder 252 has the guide hole 253. The rotary shaft 224 of the base frame 201 is inserted into the guide hole 253.

The cylinder 252 is inserted into the torsion compression coil spring 258. This torsion compression coil spring 258 keeps the retractable lens frame 250 pressed to the R3 side with respect to the base frame 201. Also, this torsion compression coil spring 258 keeps the retractable lens frame 250 pressed to the Y axis direction positive side with respect to the base frame 201.

The drive protrusion 255 extends from the outer peripheral part of the cylinder 252 in the opposite direction from the linking arm 254. The positioning protrusion 256 extends from the outer peripheral part of the lens frame main body 251 in a direction substantially perpendicular to the linking arm 254. The positioning protrusion 256 is pressed against the stopper 205 by the torsion compression coil spring 258.

The retraction main axis cover 270 is a member that keeps the retractable lens frame 250 from coming loose. The retraction main axis cover 270 is fixed to the base frame 201 by a screw 271.

An aperture cap 260 is fixed along with the retractable lens group G3$a$ to the lens frame main body 251 of the retractable lens frame 250. More precisely, the aperture cap 260 is attached on the Y axis direction positive side of the lens frame main body 251. Even more precisely, the aperture cap 260 is attached to the lens frame main body 251 on the Y axis direction positive side (the front side) of the retractable lens group G3a. That is, the retractable lens group G3a is disposed adjacent to the aperture cap 260. The aperture cap 260 has the function of a fixed aperture that restricts the optical path diameter incident on the retractable lens group G3a. Specifically, the aperture value of the optical system O is determined by the aperture cap 260.

Further, as shown in FIG. 13, the opening shape of the aperture cap 260 has a shape made up of a curved part C3 and a straight part S3. More specifically, the opening shape of the aperture cap 260 is made up of an arc part C3 (an example of a third curved part) and a straight part S3 (an example of a third straight part). Even more specifically, in the imaging state, the opening in the aperture cap 260 is made up of an arc part and a straight part so that the distance D3 (an example of a third distance) in a direction (an example of a third direction) perpendicular to the optical axis A in a cross section of the light flux passing through the retractable lens group G3a is shorter than the distance D4 (an example of a fourth distance) in a direction (an example of a fourth direction) perpendicular to the optical axis A and the first direction. The opening shape of the aperture cap 260 includes two straight parts S3 that are parallel to each other. With the aperture cap 260, the two straight parts S3 face each other in the first direction.

The opening shape of the aperture cap 260 is always circular since it is disposed at the aperture position of the optical system O. However, the opening of the aperture cap 260 here is formed in a shape made up of an arc part C3 and a straight part S3. This opening is as the same area as a circular shape. Consequently, even though the aperture cap 260 is used, an equivalent amount of light as when a conventional aperture cap is used can be ensured.

The curved part C4 (arc part) (an example of a fourth curved part) and the straight part S4 (an example of a fourth straight part) are formed at the outer periphery of the aperture cap 260. The arc part C4 on the outer periphery of the aperture cap 260 is formed to the outside of the arc part C3 in the opening of the aperture cap 260. The straight part S4 on the outer periphery of the aperture cap 260 is formed to the outside of the straight part S3 in the opening of the aperture cap 260.

As shown in FIG. 14, the outer shape of the retractable lens group G3a is formed by a shape that includes a curved part C2 (arc part) and a straight part S2, just as with the aperture cap 260. More specifically, the outer shape of the retractable lens group G3a is formed into a shape made up of an arc part C2 and a straight part S2. Even more specifically, in the imaging state, the opening in the retractable lens group G3a is made up of an arc part C2 and a straight part S2 so that the distance D1 (an example of a first distance) in a direction (an example of a first direction) perpendicular to the optical axis A in a cross section of the light flux passing through the retractable lens group G3a is shorter than the distance D2 (an example of a second distance) in a direction (an example of a second direction) perpendicular to the optical axis A and the first direction. The opening shape of the retractable lens group G3a includes two straight parts S2 that are parallel to each other. With the retractable lens group G3a, the two straight parts S2 are formed in the first direction.

With a constitution such as this, in the retracted state, the second lens group G2 and the retractable lens group G3a are disposed aligned such that the straight parts S2 of the two lens groups G2 and G3a are substantially parallel. More precisely, in a retracted state, the retractable lens group G3a is retracted so that one of the straight parts S2 of the retractable lens group G3a faces the straight part S1 of the second lens group G2. This affords a further reduction in the size of the lens barrel 3.

3.8.2: Shutter Unit

The shutter unit 230 is a mechanism for adjusting the exposure state. As shown in FIGS. 8, 9, and 10, the shutter unit 230 is disposed between the correcting lens group G3b and the fourth lens group G4. More specifically, as shown in FIG. 13, the shutter unit 230 is provided within the base frame 201, and is disposed between the correcting lens frame 240 and the base frame 201. The shutter unit 230 is movable along with the third lens frame 200 in the Y axis direction with respect to the fixed frame 20. The shutter unit 230 mainly has two shutter vanes (not shown), a light-reducing ND (neutral density) filter made up of a thin film, and a shutter actuator 235. The shutter vane is thin blades composed of PET (polyethylene terephthalate) that blocks out light. The ND filter has substantially uniform density characteristics at various wavelengths. The shutter actuator 235 has the first actuator 231 for driving the ND filter, and the second actuator 232 for driving the shutter vanes. An opening 233 is opened and closed by the ND filter when the first drive unit 231 drives the ND filter. The opening 233 is opened and closed by the shutter vanes when the second drive unit 232 drives the shutter vanes.

3.9: Fourth Lens Frame

As shown in FIG. 4, the fourth lens frame 90 is a member for supporting the fourth lens group G4 movably in the Y axis direction. The fourth lens frame 90 is supported movably in the Y axis direction by two shafts 11a and 11b formed on the master flange 10. The drive of the fourth lens frame 90 is performed by a focus motor 120 fixed to the master flange 10. When the fourth lens frame 90 is driven by the focus motor 120, the fourth lens frame 90 moves in the Y axis direction with respect to the master flange 10. This allows the focus to be adjusted in the optical system O.

3.10: Imaging Element Unit

As shown in FIG. 4, an imaging element unit 140 has an IR absorbing glass (not shown), the CCD image sensor 141, and a CCD plate 142.

The master flange 10 is fixed to the fixed frame 20, and is disposed on the Y axis direction negative side of the fixed frame 20. A rectangular opening 12 is formed in the master flange 10. The optical image formed by the optical system O passes through the opening 12 and is imaged on the light receiving face of the CCD image sensor 141.

The IR absorbing glass (not shown) is a flat and rectangular member that is smaller than the opening 12, and is disposed within the opening 12. The IR absorbing glass subjects light passing through the opening 12 to infrared absorption processing (an example of optical processing). The CCD image sensor 141 converts the light transmitted by the IR absorbing glass (not shown) into an electrical signal.

4: Operation of Digital Camera

The operation of the digital camera 1 will be described through reference to FIGS. 1 to 3.

4.1: When Power is Off

When the power switch 6 is in its off position, the lens barrel 3 is stopped in its retracted state (the state shown in FIG. 8, in which the length of the lens barrel 3 in the Y axis direction is shortest) so that the lens barrel 3 fits within the external dimensions of the shell 2 in the Y axis direction. In this state, the lens barrier 50 of the lens barrel 3 is closed.

Also, in this state, the rectilinear restricting face 86b of the rectilinear frame 80 pushes the drive protrusion 255 of the retractable lens frame 250 to the R4 side around the center axis B of the rotary shaft 224. Accordingly, the retractable lens group G3a stops at the retracted position that is out of the optical axis A (see FIGS. 11 and 12A). Also, the end face 86c of the rectilinear frame 80 holds the drive protrusion 255 of the retractable lens frame 250 toward the Y axis direction negative side. In other word, the drive protrusion 255 of the retractable lens frame 250 is positioned on the end face 86c of the rectilinear frame 80 when the state of the lens barrel 3 changes from the imaging state (see FIG. 9) to the retracted state. Consequently, the distance between the retractable lens frame 250 and the shutter unit 230 is shorter than in the imaging state (see FIG. 9).

4.2: Operation when Power is on 4.2.1: Operation of the Lens Barrel

When the power switch 6 is switched on, power is supplied to the various components and the lens barrel 3 is driven from its retracted state to its imaging state. More specifically, the drive frame 30 is driven by the zoom motor unit 110 by a specific angle with respect to the fixed frame 20. As a result, the drive frame 30 moves along the cam grooves 23 to the Y axis direction positive side with respect to the fixed frame 20 while rotating with respect to the fixed frame 20.

When the drive frame 30 moves in the Y axis direction while rotating with respect to the fixed frame 20, the first rotary protrusions 43 and the second rotary protrusions 45 cause the camera cam frame 40 to move integrally with the drive frame 30 in the Y axis direction. At this point, since the rectilinear protrusions 47 of the camera cam frame 40 are guided in the Y axis direction by the rectilinear grooves 27 of the fixed frame 20. Consequently, the camera cam frame 40 moves integrally with the drive frame 30 in the Y axis direction without rotating with respect to the fixed frame 20 (see FIG. 5).

Also, the distal ends 76b of the cam pins 76 of the rotary cam frame 70 are fitted into the rectilinear grooves 38 of the drive frame 30, so the rotary cam frame 70 rotates along with the drive frame 30 with respect to the fixed frame 20. As a result, the rotary cam frame 70 and the camera cam frame 40 rotate relatively. Also, the cam pins 76 of the rotary cam frame 70 go through the cam through-grooves 42 of the camera cam frame 40, so when the rotary cam frame 70 rotates with respect to the camera cam frame 40, the rotary cam frame 70 moves in the Y axis direction while rotating with respect to the camera cam frame 40 and the fixed frame 20, according to the shape of the cam through-grooves 42 (see FIGS. 5 and 6).

The rectilinear frame 80 is provided to be rotatable with respect to the rotary cam frame 70 and integrally movable in the Y axis direction. The rectilinear frame 80 is provided to be movable in the Y axis direction without rotating with respect to the camera cam frame 40. More specifically, the rotary protrusions 83 of the rectilinear frame 80 are inserted into the rotary grooves 77 of the rotary cam frame 70, and the second rectilinear protrusions 85 of the rectilinear frame 80 are inserted into the rectilinear grooves 46 of the camera cam frame 40. With this constitution, when the rotary can frame 70 moves in the Y axis direction while rotating with respect to the fixed frame 20, the rectilinear frame 80 moves in the Y axis direction integrally with the rotary cam frame 70 without rotating with respect to the fixed frame 20 and the camera cam frame 40 (see FIGS. 5 and 6).

Furthermore, when the rotary cam frame 70 rotates with respect to the fixed frame 20, the first cam pins 68 of the first lens frame 60 are guided in the Y axis direction by the first cam grooves 72 of the rotary cam frame 70. Accordingly, the first lens frame 60 moves in the Y axis direction with respect to the rotary cam frame 70 and the rectilinear frame 80. At this point, the first rectilinear grooves 63 of the first lens frame 60 are inserted into the first rectilinear protrusions 82 of the rectilinear frame 80, so the first lens frame 60 moves in the Y axis direction without rotating with respect to the rectilinear frame 80. Therefore, the first lens frame 60 moves in the Y axis direction without rotating with respect to the fixed frame 20 (while rotating with respect to the rotary cam frame 70), according to the shape of the first cam grooves 72.

The cam pins 192 of the second lens frame 190 are fitted into the third cam grooves 74 of the rotary cam frame 70. Since the rectilinear protrusions 191 of the second lens frame 190 are inserted into the rectilinear grooves 84 of the rectilinear frame 80, the second lens frame 190 moves in the Y axis direction without rotating with respect to the rectilinear frame 80. With this constitution, the second lens frame 190 moves in the Y axis direction according to the shape of the third cam grooves 74, without rotating with respect to the camera cam frame 40 and the fixed frame 20.

Also, since the rectilinear protrusions 203 of the third lens frame 200 are inserted into the rectilinear through-grooves 48 of the camera cam frame 40, the third lens frame 200 is movable in the Y axis direction without rotating with respect to the fixed frame 20 and the camera cam frame 40. Furthermore, the cam pins 204 are fitted into the cam grooves 39 of the drive frame 30. With this constitution, the third lens frame 200 moves in the Y axis direction according to the shape of the cam grooves 39, without rotating with respect to the camera cam frame 40 and the fixed frame 20.

As shown in FIGS. 8 and 9, when the zoom motor unit drives the lens barrel 3 from the retracted state to the imaging state, the drive frame 30 moves to the Y axis direction positive side while rotating with respect to the fixed frame 20. Meanwhile, the third lens frame 200 moves to the Y axis direction negative side with respect to the drive frame 30. Accordingly, the third lens frame 200 moves to the Y axis direction positive side with respect to the fixed frame 20, but the amount of movement of the third lens frame 200 is limited with respect to the fixed frame 20.

Meanwhile, since the second rectilinear protrusions 85 of the rectilinear frame 80 are inserted into the rectilinear grooves 46 of the camera cam frame 40, the rectilinear frame 80 is movable in the Y axis direction without rotating with respect to the fixed frame 20 and the camera cam frame 40. Furthermore, since the rotary protrusions 83 of the rectilinear frame 80 are meshed with the rotary protrusions 75 of the rotary cam frame 70, the rectilinear frame 80 moves in the Y axis direction along with the rotary cam frame 70 in a state in which relative rotation is permitted. When the drive frame 30 rotates with respect to the fixed frame 20, the rotary cam frame 70 rotates with respect to the camera cam frame 40, and the cam pins 76 of the rotary cam frame 70 are guided by the cam through-grooves 42 of the camera cam frame 40. Consequently, the rectilinear frame 80 moves in the Y axis direction along with the rotary cam frame 70 without rotating with respect to the fixed frame 20 and the camera cam frame 40. More specifically, the rectilinear frame 80 moves to the Y axis direction positive side along with the rotary cam frame 70 without rotating with respect to the fixed frame 20. The movement amount of the rectilinear frame 80 with respect to the fixed frame 20 here is greater than the movement amount of the third lens frame 200 with respect to the fixed frame 20, so in the course of switching the lens barrel 3 from its retracted state to its imaging state, the rectilinear frame 80 moves away from the third lens frame 200 to the Y axis direction positive side.

As the rectilinear frame 80 thus moves away from the third lens frame 200, the retractable lens frame 250 moves to the Y axis direction positive side along with the rectilinear frame 80 in a state in which the drive protrusion 255 is pressed against the end face 86c of the rectilinear frame 80. At this point the retractable lens frame 250 moves to the Y axis direction positive side with respect to the base frame 201. When the retractable lens frame 250 hits the retraction main axis cover 270, movement of the retractable lens frame 250 in the Y axis direction with respect to the base frame 201 stops, and the rectilinear frame 80 moves away from the retractable lens frame 250 to the Y axis direction positive side.

As the rectilinear frame 80 moves away from the retractable lens frame 250 to the Y axis direction positive side, the drive protrusion 255 of the retractable lens frame 250 moves to the inclined face 86a while sliding with the rectilinear restriction face 86b of the rectilinear frame 80, and further slides with the inclined face 86a. At this point, since the drive protrusion 255 is pressed against the inclined face 86a by the torsional force of the torsion compression coil spring 258, the retractable lens frame 250 rotates from the retracted position to the insertion position on the R3 side, according to the shape of the inclined face 86a. The retractable lens frame 250 is positioned at the position where the positioning protrusion 256 hits the stopper 205 (that is, the insertion position) by the torsional force of the torsion compression coil spring 258 (see FIGS. 11 and 12B). At the insertion position, the optical axis C of the retractable lens group G3a substantially coincides with the optical axis A of the optical system O. Here, a state in which "the optical axis C of the retractable lens group G3a substantially coincides with the optical axis A of the optical system O" includes not only a state in which the optical axis C coincides completely with the optical axis A, but also a state in which the optical axis C is off center from the optical axis A within a range that is permissible by optical design.

As discussed above, when drive force is inputted to the drive frame 30 during telescoping operation, the drive frame 30 moves in the Y axis direction with respect to the fixed frame 20, and the various components supported by the drive frame 30 move in the Y axis direction with respect to the fixed frame 20. When the drive frame 30 rotates by a specific angle, rotation of the drive frame 30 stops, and the first lens frame 60, the second lens frame 190, and the third lens frame 200 stop at the wide angle end. As a result of the above operation, the lens barrel 3 enters an imaging state (such as the state shown in FIG. 9), and imaging with the digital camera 1 becomes possible.

4.3: Zoom Operation During Imaging 4.3.1: Operation on Telephoto Side

When the zoom adjusting lever 7 is moved to the telephoto side, the zoom motor unit 110 drives the drive frame 30 with respect to the fixed frame 20 according to the rotational angle and operation duration of the zoom adjusting lever 7. As a result, the rotary cam frame 70 moves to the Y axis direction positive side with respect to the drive frame 30 while rotating along with the drive frame 30. At this point, the drive frame 30 moves slightly in the Y axis direction along the cam grooves 23 while rotating with respect to the fixed frame 20.

Also, the first lens frame 60 mainly moves to the Y axis direction positive side without rotating with respect to the fixed frame 20. Meanwhile, the second lens frame 190 mainly moves to the Y axis direction negative side without rotating with respect to the fixed frame 20. Furthermore, the third lens frame 200 mainly moves to the Y axis direction positive side without rotating with respect to the fixed frame 20. At this point, the retractable lens frame 250, the correcting lens support mechanism 290, and the shutter unit 230 move integrally to the Y axis direction positive side. As a result of these operations, the zoom ratio of the optical system O gradually increases. When the lens barrel 3 reaches the telephoto end, the lens barrel 3 stops in the state shown in FIG. 10.

In the above operation, since a state is maintained in which the inclined face 86a of the rectilinear frame 80 is separated from the drive protrusion 255, the retractable lens frame 250 is in a state of being stopped at the insertion position.

4.3.2: Operation on Wide Angle Side

When the zoom adjusting lever 7 is moved to the wide angle side, the drive frame 30 is driven by the zoom motor unit 110 to the R1 side with respect to the fixed frame 20 according to the rotational angle and operation duration of the zoom adjusting lever 7. As a result, the rotary cam frame 70 moves to the Y axis direction negative side with respect to the drive frame 30 while rotating along with the drive frame 30. The drive frame 30 here moves slightly in the Y axis direction along the cam grooves 23 while rotating with respect to the fixed frame 20.

Also, the first lens frame 60 moves mainly to the Y axis direction negative side without rotating with respect to the fixed frame 20. Meanwhile, the second lens frame 190 moves mainly to the Y axis direction positive side without rotating with respect to the fixed frame 20. Furthermore, the third lens frame 200 moves mainly to the Y axis direction negative side without rotating with respect to the fixed frame 20. At this point the retractable lens frame 250, the correcting lens support mechanism 290, and the shutter unit 230 move integrally to the Y axis direction negative side. As a result of these operations, the zoom ratio of the optical system O gradually decreases. When the lens barrel 3 reaches the wide angle end, the lens barrel 3 stops in the state shown in FIG. 9.

Just as with operation on the telephoto side, in the above operation, since a state is maintained in which the inclined face 86a of the rectilinear frame 80 is separated from the drive protrusion 255, the retractable lens frame 250 is in a state of being stopped at the insertion position.

5: Features

The features of the lens band 3 described above are compiled below. The lens barrel 3 comprises a zoom optical system. The lens barrel 3 comprises the second lens group G2 (one example of a first lens group) and the retractable lens group G3a (one example of a second lens group). The second lens group G2 is configured to have an outer shape that includes an arc part and a straight part when viewed in the optical axis direction. The retractable lens group G3a is configured to have a shape that includes an arc part and a straight part when viewed in the optical axis direction. This lens barrel 3 is configured to be in an imaging state or a retracted state. In the imaging state, the second lens group G2 and the retractable lens group G3a are configured to be aligned in the direction of the optical axis A of the second lens group G2. In the retracted state, as viewed in the optical axis direction, the retractable lens group G3a is configured to retract so that the straight part S1 of the second lens group G2 is substantially parallel with the straight part S2 of the retractable lens group G3a.

In an embodiment of the technology disclosed herein, in a retracted state, the second lens group G2 and the retractable lens group G3a can be efficiently disposed on the inside of the cylindrical first lens frame 60, so the lens barrel 3 can be made more compact.

When the aperture cap 260 is adjacent to the retractable lens group G3a as in this example, the light flux that has passed through the aperture cap 260 is inputted substantially directly to the retractable lens group G3a, without any change in its cross sectional area or the like. This allows the diameter of the retractable lens group G3a to be made smaller.

However, when the aperture cap 260 is adjacent to the retractable lens group G3a, since the light flux is inputted directly from the aperture cap 260 to the retractable lens group G3a as mentioned above. If the opening shape of the aperture cap 260 is circular and just the retractable lens group G3a is cut out to provide the straight part S2, part of the light flux from the aperture cap 260 may be away from the retractable lens group G3a.

On the other hand, if the opening shape of the aperture cap 260 includes an arc part C3 and a straight part S3, then the light flux passing through the retractable lens group G3a have a cross section similar to the opening shape of the aperture cap 260. Consequently, even though a straight part S2 is provided by cutting out part of the retractable lens group G3a, the light flux from the aperture cap 260 can be properly inputted to the retractable lens group G3a.

Also, the opening area of the aperture cap 260 here is made equivalent to the area when the opening is circular, so the lens barrel 3 can be made smaller without sacrificing the brightness of the optical system O.

Other Embodiments

Embodiments of the present technology are not limited to what was given above, and various changes and modifications are possible without departing from the gist of the technology. Those components having substantially the same configuration and function as in the above embodiment are numbered the same as in the above embodiment, and will not be described in detail again.

The constitution of the optical system O is not limited to that given above. For example, the various lens groups may be constituted by a single lens, or may be constituted by a plurality of lenses.

In the above embodiment, interference between the second lens frame main body 193 and the retractable lens frame 250 in a retracted state is prevented by using the rectilinear frame 80 to move the retractable lens frame 250 to the Y axis direction negative side. However, further reduction in the size of the lens barrel 3 is also possible even if the retractable lens frame 250 is not moved in the Y axis direction.

The positional relations between the retractable lens group G3a, the correcting lens group G3b, the aperture cap 260, and the shutter unit 230 are not limited to those in the above embodiment.

Figure 16A:
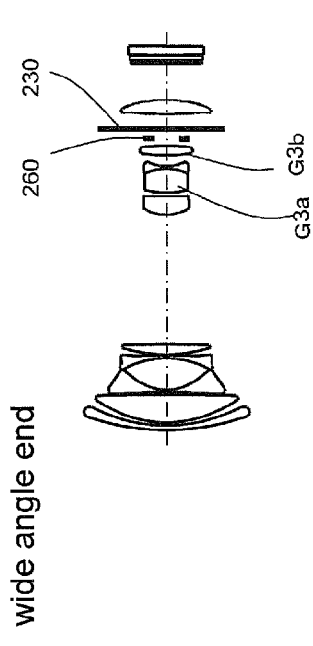
FIG. 16A is a simplified diagram of an optical system (wide angle end)
Figure 16B:
FIG. 16B is a simplified diagram of an optical system (retracted position)
Figure 17A:
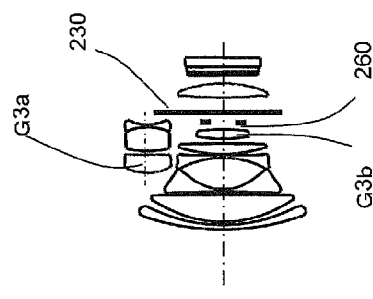
FIG. 17A is a simplified diagram of an optical system (wide angle end)
Figure 17B:
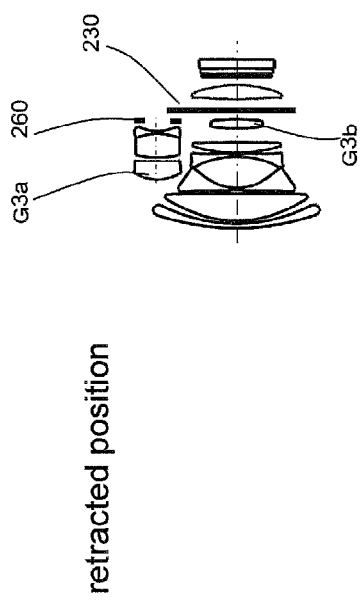
FIG. 17B is a simplified diagram of an optical system (retracted position).

For example, as shown in FIG. 15, the shutter unit 230 may be disposed between the correcting lens group G3b and the retractable lens group G3a. Alternatively, as shown in FIGS. 16 and 17, the aperture cap 260 may be disposed on the shutter unit 230 side (to the rear side of the retractable lens group G3a).

In the above embodiment, the second lens group G2 had a shape that cuts out the portion corresponding to the short-side direction of the captured rectangular image, but so long as there is no problem with the quantity of light, the direction of cutting is not limited to the short-side direction.

In the above embodiment, the retractable lens group G3a had an outer shape made up two straight parts S2 and an arc part C2. But the number of the straight part S1 does not necessarily have to be two. In other words, there may be at least one straight part S1. In this case, a reduction in size is possible.

The aperture cap 260 may be an iris that can change its opening diameter instead of a fixed aperture.

In the above embodiment, a digital still camera was described as an example of a device in which the lens barrel 3 is installed, but the device in which the lens barrel 3 is installed may be any device with which an optical image needs to be formed. Examples of devices in which the lens barrel 3 is installed include an imaging device capable of capturing only still pictures, an imaging device capable of capturing only moving pictures, and an imaging device capable of capturing both still and moving pictures.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present invention should be interpreted relative to the lens barrel.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

INDUSTRIAL APPLICABILITY

The present technology is useful in the field of optical devices. The lens barrel pertaining to the present technology allows a reduction in size.

What is claimed is:

1. A lens barrel including a zoom optical system having an optical axis, the lens barrel comprising:
    a first lens group having a first curved part and a first straight part when viewed along the direction of the optical axis; and
    a second lens group movably and axially disposed relative to the first lens group, the second lens group having a second curved part and a second straight part when viewed along the direction of the optical axis, the lens barrel being configured to change between an imaging state and a retracted state, in the imaging state the first lens group and the second lens group are aligned with one another along the direction of the optical axis, and in the retracted state the second lens group is disposed off center from the first lens group so that the first straight part is substantially parallel with the second straight part.

2. The lens barrel according to claim 1, wherein in the imaging state, the second lens group includes a cross section that allows a light flux to pass through the second lens group, the cross section has a first distance and a second distance, the first distance defines a first direction that is perpendicular to the optical axis, the second distance is greater than the first distance and defines a second direction that is perpendicular to the first direction and the light flux.

3. The lens barrel according to claim 2, wherein the second straight part is formed in the first direction on the second lens group.

4. The lens barrel according to claim 1, wherein the second lens group has a shape that includes two second straight parts that are arranged parallel to each other, and in the retracted state the second lens group is disposed off center from the first lens group so that one of the second straight parts is disposed adjacent to and facing the first straight part of the first lens group.

5. The lens barrel according to claim 1, further comprising:

an aperture disposed proximate to the second lens group, wherein the opening shape of the aperture includes a third curved part and a third straight part.

6. The lens barrel according to claim 5, wherein in the imaging state, the aperture includes a cross section that defines an opening that allows a light flux to pass through the aperture, the cross section has a third distance and a fourth distance, the third distance defines a third direction that is perpendicular to the optical axis, the fourth distance is greater than the third distance and defines a fourth direction that is perpendicular to the third direction and the light flux.

7. The lens barrel according to claim 5, wherein the aperture has a shape that includes a fourth curved part and a fourth straight part.

8. The lens barrel according to claim 1, wherein the first curved part and first straight part are substantially disposed on a first plane transverse to the optical axis; and the second curved part and the second straight part are substantially disposed on a second plane transverse to the optical axis.

9. A lens barrel including a zoom optical system having an optical axis, the lens barrel comprising:

a first lens group having a first curved part and a first straight part when viewed along the direction of the optical axis; and a second lens group movably and axially disposed relative to the first lens group, the second lens group having a second curved part and a second straight part when viewed along the direction of the optical axis, the lens barrel being configured to change between an imaging state and a retracted state, in the imaging state the first lens group and the second lens group are aligned with one another along the direction of the optical axis, and in the retracted state the second lens group is disposed off center from the first lens group so that the first straight part is substantially parallel with the second straight part;

wherein in the imaging state, the aperture includes a cross section that defines an opening that allows a light flux to pass through an aperture, the cross section has a third distance and a fourth distance, the third distance defines a third direction that is perpendicular to the optical axis, the fourth distance is greater than the third distance and defines a fourth direction that is perpendicular to the third direction and the light flux.

* * * * *